US012461570B2

(12) United States Patent
Kim et al.

(10) Patent No.: US 12,461,570 B2
(45) Date of Patent: Nov. 4, 2025

(54) ELECTRONIC DEVICE COMPRISING HINGE ASSEMBLY

(71) Applicant: SAMSUNG ELECTRONICS CO., LTD., Suwon-si (KR)

(72) Inventors: Jongkeun Kim, Suwon-si (KR); Giyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 18/383,639

(22) Filed: Oct. 25, 2023

(65) Prior Publication Data

US 2024/0053802 A1   Feb. 15, 2024

Related U.S. Application Data

(63) Continuation of application No. PCT/KR2022/005685, filed on Apr. 21, 2022.

(30) Foreign Application Priority Data

Jul. 12, 2021   (KR) ........................ 10-2021-0090683

(51) Int. Cl.
*G06F 1/16* (2006.01)
(52) U.S. Cl.
CPC .......... *G06F 1/1681* (2013.01); *G06F 1/1652* (2013.01)
(58) Field of Classification Search
CPC combination set(s) only.
See application file for complete search history.

(56) References Cited

U.S. PATENT DOCUMENTS

| | | | |
|---|---|---|---|
| 8,971,031 B2 | 3/2015 | Mok et al. | |
| 8,982,542 B2 | 3/2015 | Bohn | |
| 9,069,531 B2 | 6/2015 | Bohn et al. | |
| 10,564,681 B2 * | 2/2020 | Siddiqui | G06F 1/1656 |

(Continued)

FOREIGN PATENT DOCUMENTS

| | | |
|---|---|---|
| KR | 10-2020-0005148 A | 1/2020 |
| KR | 10-2020-0126524 A | 11/2020 |

(Continued)

OTHER PUBLICATIONS

International Search Report (PCT/ISA/210) issued on Jul. 27, 2022 by the International Searching Authority in International Patent Application No. PCT/KR2022/005685.

(Continued)

*Primary Examiner* — Lisa Lea-Edmonds
(74) *Attorney, Agent, or Firm* — Sughrue Mion, PLLC

(57) ABSTRACT

An electronic device includes a display including a first area, a second area, and a folding area that is between the first area and the second area, a first housing supporting the first area, a second housing supporting the second area, and a hinge assembly foldably connecting the first housing and the second housing to be foldable with respect to each other between a folded state in which the first area and the second area face each other, and unfolded state in which the first area and the second area do not face each other, where the hinge assembly includes a hinge bracket including two fixed cams and two first rail structures, the hinge bracket defining two hinge axes and two hinge structures each rotatably connected to a respective one of the two first rail structures.

20 Claims, 27 Drawing Sheets

(56) References Cited

U.S. PATENT DOCUMENTS

| | | |
|---|---|---|
| 10,754,377 B2 | 8/2020 | Siddiqui |
| 11,353,932 B2* | 6/2022 | Kim .................... E05D 11/1078 |
| 11,360,526 B2* | 6/2022 | Kim ...................... G06F 1/1681 |
| 11,726,532 B2* | 8/2023 | Kim .................... E05D 11/1078 |
| | | 455/575.3 |
| 11,889,006 B2* | 1/2024 | Kim ...................... H04M 1/022 |
| 12,066,872 B2* | 8/2024 | Kim .......................... G06F 1/16 |
| 2019/0278338 A1 | 9/2019 | Siddiqui |
| 2020/0267244 A1* | 8/2020 | Kim ...................... G06F 1/1641 |
| 2020/0329574 A1* | 10/2020 | Lee ...................... H04M 1/0216 |
| 2020/0348732 A1* | 11/2020 | Kang .................... G06F 1/1652 |
| 2021/0041921 A1* | 2/2021 | Kang .................... G06F 1/1681 |
| 2021/0274028 A1 | 9/2021 | Park et al. |
| 2021/0392213 A1* | 12/2021 | Kim ...................... H05K 5/0226 |
| 2022/0113770 A1* | 4/2022 | Kang .................... G06F 1/1681 |
| 2022/0283612 A1* | 9/2022 | Kim ...................... H05K 5/0226 |
| 2022/0311843 A1* | 9/2022 | Kim ........................ F16C 11/04 |
| 2023/0229204 A1* | 7/2023 | Shim ...................... H04M 1/022 |
| | | 361/679.28 |
| 2023/0308531 A1* | 9/2023 | Kim ...................... H04M 1/0268 |
| 2024/0053802 A1* | 2/2024 | Kim ...................... G06F 1/1652 |
| 2024/0053803 A1* | 2/2024 | Park ...................... G06F 1/1681 |

FOREIGN PATENT DOCUMENTS

| | | |
|---|---|---|
| KR | 10-2257326 B1 | 5/2021 |
| KR | 10-2021-0066784 A | 6/2021 |
| KR | 10-2022-0007321 A | 1/2022 |

OTHER PUBLICATIONS

Written Opinion (PCT/ISA/237) issued on Jul. 27, 2022 by the International Searching Authority in International Patent Application No. PCT/KR2022/005685.

* cited by examiner

ELECTRONIC DEVICE COMPRISING HINGE ASSEMBLY

CROSS-REFERENCE TO RELATED APPLICATIONS

This application is a continuation of International Application No. PCT/KR2022/005685, filed on Apr. 21, 2022, in the Korean Intellectual Property Receiving Office, which is based on and claims priority to Korean Patent Application No. 10-2021-0090683, filed on Jul. 12, 2021, in the Korean Intellectual Property Office, the disclosures of which are incorporated herein by reference in their entireties.

BACKGROUND

1. Field

The disclosure relates to an electronic device including a hinge assembly.

2. Description of Related Art

Recently, with the development of display-related technologies, electronic devices with flexible displays have been developed. A flexible display may be used in the form of a flat surface and may also be transformed to be used in a specific shape. For example, an electronic device with a flexible display may be implemented in a foldable form to be folded or unfolded about at least one folding axis.

To implement a folding or unfolding operation of an electronic device, a hinge assembly may be provided between a first housing and a second housing. The hinge assembly may have a structure for generating a force to maintain a predetermined folding state of the electronic device. To implement such a structure, the hinge assembly may use a cylindrical cam structure and a spring. However, as the thickness of the electronic device decreases, the diameter of the cylindrical cam structure and the spring may also decrease, and this may cause a decrease in an elastic force of the spring. To compensate for the decrease, a method of mounting the spring on the exterior of the hinge assembly may be used, however, in this structure, torque may be generated, and the cylindrical cam structure may be tilted toward a gap between components. When the cylindrical cam structure is tilted, the elastic force of the spring may not be sufficiently relayed, and an operation of the hinge assembly may not be smoothly implemented during a folding or unfolding operation due to the interference between components.

SUMMARY

Provided are a hinge assembly that may generate a sufficient force while the thickness of the hinge assembly is thin and an electronic device including the hinge assembly.

Further, provided are a hinge assembly that may smoothly operate by improving an abnormal operation and an electronic device including the hinge assembly.

Further still, provided are a hinge assembly that may be lightened and slimmed by decreasing the number of components and an electronic device including the hinge assembly.

Additional aspects will be set forth in part in the description which follows and, in part, will be apparent from the description, or may be learned by practice of the presented embodiments.

According to an aspect of the disclosure, an electronic device may include a display including a first area, a second area, and a folding area that is between the first area and the second area, a first housing supporting the first area, a second housing supporting the second area, and a hinge assembly foldably connecting the first housing and the second housing to be foldable with respect to each other between a folded state in which the first area and the second area face each other, and unfolded state in which the first area and the second area do not face each other, where the hinge assembly may include a hinge bracket including two fixed cams and two first rail structures, the hinge bracket defining two hinge axes and two hinge structures each rotatably connected to a respective one of the two first rail structures, each of the two hinge structure may include a first hinge member including a first side connected to the first housing or the second housing, and a second side rotatably connected to the respective one of the two first rail structures and configured to rotate about a respective hinge axis of the two hinge axes, a second hinge member connected to the first hinge member and configured to integrally rotate with the first hinge member about the respective hinge axis, the second hinge member including a rotating cam configured to interoperate with a respective fixed cam of the two fixed cams, and an elastic member configured to provide an elastic force to the second hinge member in a direction in which the rotating cam presses the respective fixed cam of the two fixed cams, and the second hinge member may be configured to pivot with respect to the first hinge member about a pivot axis that is perpendicular to the hinge axis.

Each of the two hinge structures may include a pin member penetrating the first hinge member and the second hinge member and inserted in the elastic member.

The second hinge member may include a pin through hole which is penetrated by the pin member, and the pin member may penetrate at least a portion of the pin through hole at an incline for a pivoting operation of the second hinge member.

The first hinge member may include a first structure on a first side thereof, the second hinge member may include a second structure at a position corresponding to a position of the first structure, and the first structure and the second structure may be configured to interoperate with each other and define the pivot axis.

The first structure may include at least one first recess and at least one first protrusion and the second structure may include at least one second recess engaged with the at least one first protrusion and at least one second protrusion engaged with the at least one first recess.

The at least one first recess, the at least one second protrusion, and the at least one second recess may have an arcuate cross-section and may be configured to rotate while contacting each other.

The at least one first recess and the at least one first protrusion may alternate with each other, and the at least one second recess and the at least one second protrusion may alternate with each other.

The first hinge member may include a protruding pin protruding in a direction toward the second hinge member and the second hinge member may include an insertion hole into which the protruding pin is inserted.

The first hinge member may include a first structure that is planar, the second hinge member may include a second structure protruding as an arcuate cross-section and configured to rotate with respect to the first structure while contacting the first structure and the first structure and the second structure may interoperate with each other and define the pivot axis.

The first hinge member may include a support structure supporting the elastic member.

The first hinge member may include a protruding guide protruding in a direction toward the second hinge member, the second hinge member may include a guide hole into which the protruding guide is inserted and the protruding guide and the guide hole may have an arc shape.

In each of the two hinge structures, the respective fixed cam of the two fixed cams may include a first inclined surface, a first flat surface, and a second inclined surface and the rotating cam may include a third inclined surface, a second flat surface, and a fourth inclined surface.

In the unfolded state, the first inclined surface of the fixed cam may contact the third inclined surface of the rotating cam and the elastic member may be configured to generate a reaction force in a direction perpendicular to the first inclined surface and the third inclined surface to maintain the two hinge structures in the unfolded state.

In an intermediate state between the unfolded state and the folded state the first flat surface of the fixed cam may contact the second flat surface of the rotating cam, and the elastic member may be configured to generate a reaction force in a direction perpendicular to the first flat surface and the second flat surface to maintain the two hinge structures in the intermediate state.

In the folded state, the second inclined surface of the fixed cam may contact the fourth inclined surface of the rotating cam and the elastic member is configured to generate a reaction force in a direction perpendicular to the second inclined surface and the fourth inclined surface, to maintain the two hinge structures in the folded state.

According to an aspect of the disclosure, a hinge assembly of a foldable electronic device including a first housing and a second housing, may include a hinge bracket including two fixed cams and two first rail structures, the hinge bracket defining two hinge axes, and two hinge structures each rotatably connected to a respective one of the two first rail structures, where each of the two hinge structures may include a first hinge member including a first side connected to the first housing or the second housing, and a second side rotatably connected to the respective one of the two first rail structures and configured to rotate about a respective hinge axis of the two hinge axes, a second hinge member connected to the first hinge member and configured to integrally rotate with the first hinge member about the respective hinge axis, the second hinge member including a rotating cam configured to interoperate with a respective fixed cam of the two fixed cams and an elastic member configured to provide an elastic force to the second hinge member in a direction in which the rotating cam presses the respective fixed cam of the two fixed cams, and the second hinge member may be configured to pivot with respect to the first hinge member about a pivot axis that is perpendicular to the hinge axis.

Each of the two hinge structures further may include a pin member penetrating the first hinge member and the second hinge member in a state in which the elastic member is inserted into the pin member, the second hinge member may include a pin through hole into which is penetrated by the pin member, and the pin member may penetrate at least a portion of the pin through hole at an incline for a pivoting operation of the second hinge member.

The first hinge member may include a first structure on a first side thereof, the second hinge member may include a second structure at a position corresponding to a position of the first structure to interoperate with the first structure, the first structure may include at least one first recess and at least one first protrusion, the second structure may include at least one second recess engaged with the at least one first protrusion and at least one second protrusion engaged with the at least one first recess, and the at least one first recess, the at least one second protrusion, and the at least one second recess may have an arcuate cross-section, may be configured to interoperate with each other, and may define the pivot axis.

The at least one first recess and the at least one first protrusion may alternate with each other and the at least one second recess and the at least one second protrusion may alternate with each other.

According to an aspect of the disclosure, an electronic device may include a display including a first area, a second area, and a folding area that is between the first area and the second area, a first housing supporting the first area, a second housing supporting the second area, and a hinge assembly foldably connecting the first housing and the second housing to be foldable with respect to each other between a folded state in which the first area and the second area face each other, and an unfolded state in which the first area and the second area do not face each other, where the hinge assembly may include a hinge bracket including two fixed cams and two first rail structures, the hinge bracket defining two hinge axes and two hinge structures each rotatably connected to a respective one of the two first rail structures, each of the two hinge structures may include a first hinge member including a first side connected to the first housing or the second housing, and a second side rotatably connected to the respective one of the two first rail structures and configured to rotate about a respective hinge axis of the two hinge axes, a second hinge member connected to the first hinge member and configured to integrally rotate with the first hinge member about the respective hinge axis, the second hinge member including a rotating cam configured to interoperate with a respective fixed cam of the two fixed cams, an elastic member configured to provide an elastic force to the second hinge member in a direction in which the rotating cam presses the respective fixed cam of the two fixed cams, and a pin member penetrating the first hinge member and the second hinge member in a state in which the elastic member is inserted into the pin member, where the second hinge member may be configured to pivot with respect to the first hinge member about a pivot axis that is perpendicular to the hinge axis, the first hinge member may include a first structure on a first side, the second hinge member may include a second structure at a position corresponding the first side of the first structure, the first structure may include at least one first recess and at least one first protrusion, the second structure may include at least one second recess engaged with the at least one first protrusion and at least one second protrusion engaged with the at least one first recess and the at least one first recess, the at least one second protrusion, and the at least one second recess, may have an arcuate cross-section, may be configured to interoperate with each other, and may define the pivot axis.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
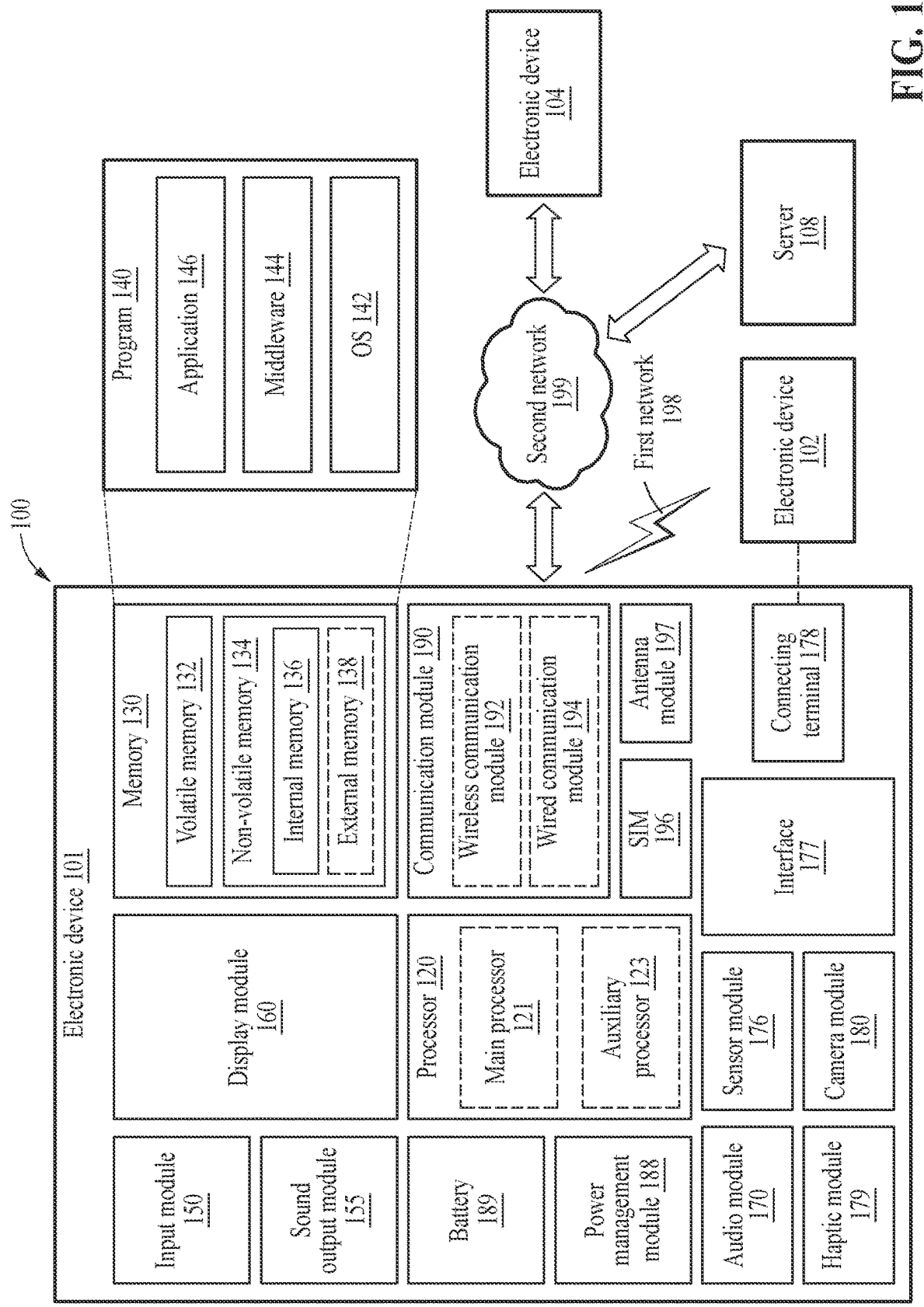
FIG. 1 is a block diagram illustrating an electronic device in a network environment, according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

FIG. 1 is a block diagram illustrating an electronic device 101 in a network environment 100 according to various example embodiments.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented as separate from, or as part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., an NPU) may include a hardware structure specified for artificial intelligence model processing. An artificial intelligence model may be generated through machine learning. Such learning may be performed, for example, by the electronic device 101 in which an artificial intelligence model is executed, or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The artificial intelligence model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to sense a touch, or a pressure sensor adapted to measure the intensity of force incurred by the touch.

The audio module 170 may convert a sound into an electrical signal and vice versa. According to an embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a PCB, an RFIC disposed on a first surface (e.g., the bottom surface) of the PCB or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed at the electronic device 101 may be executed at one or more of external electronic devices (e.g., the external electronic devices 102 and 104, or the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
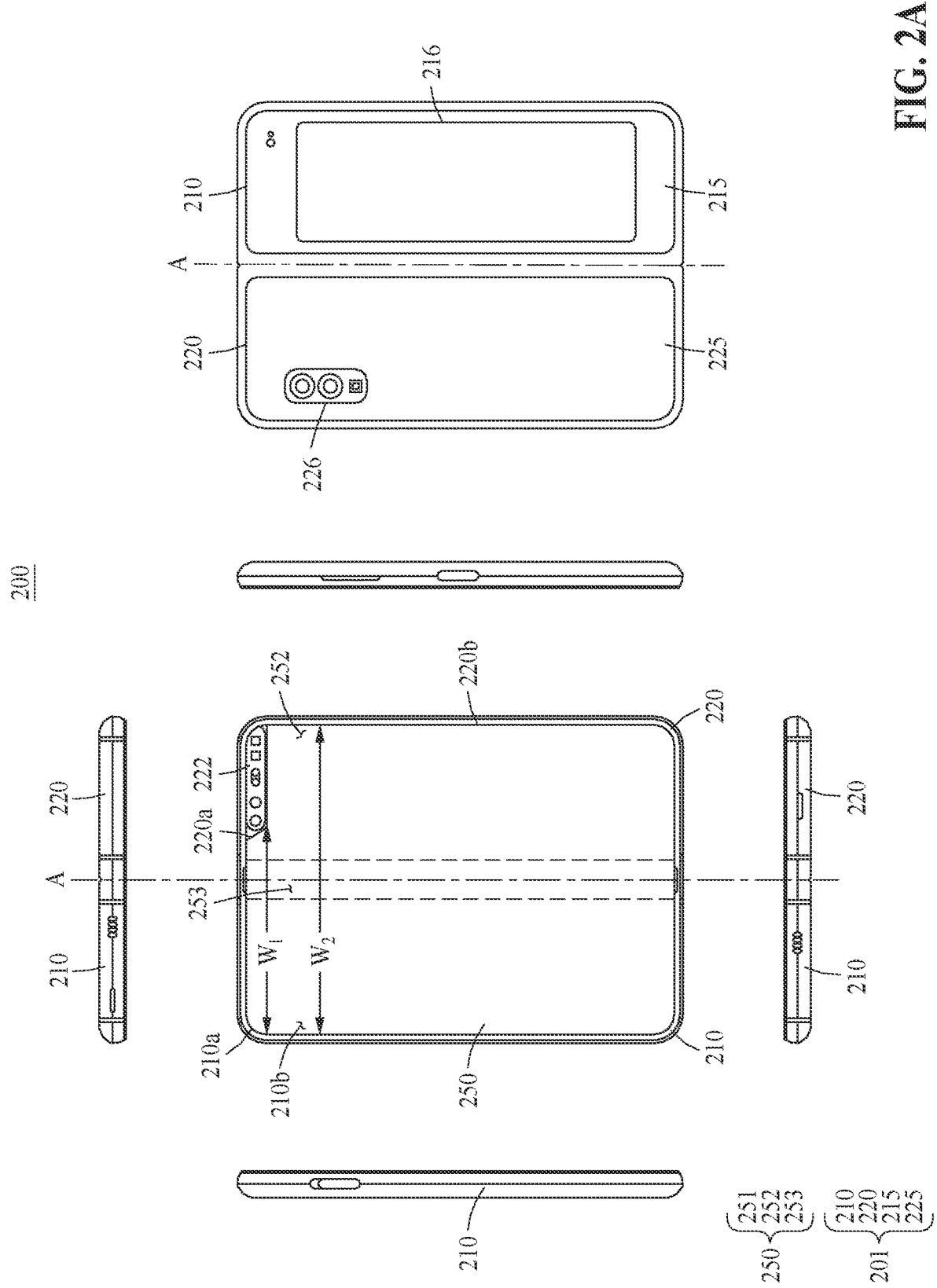
FIG. 2A is a diagram illustrating an unfolded state of an electronic device according to an embodiment.
Figure 2B:
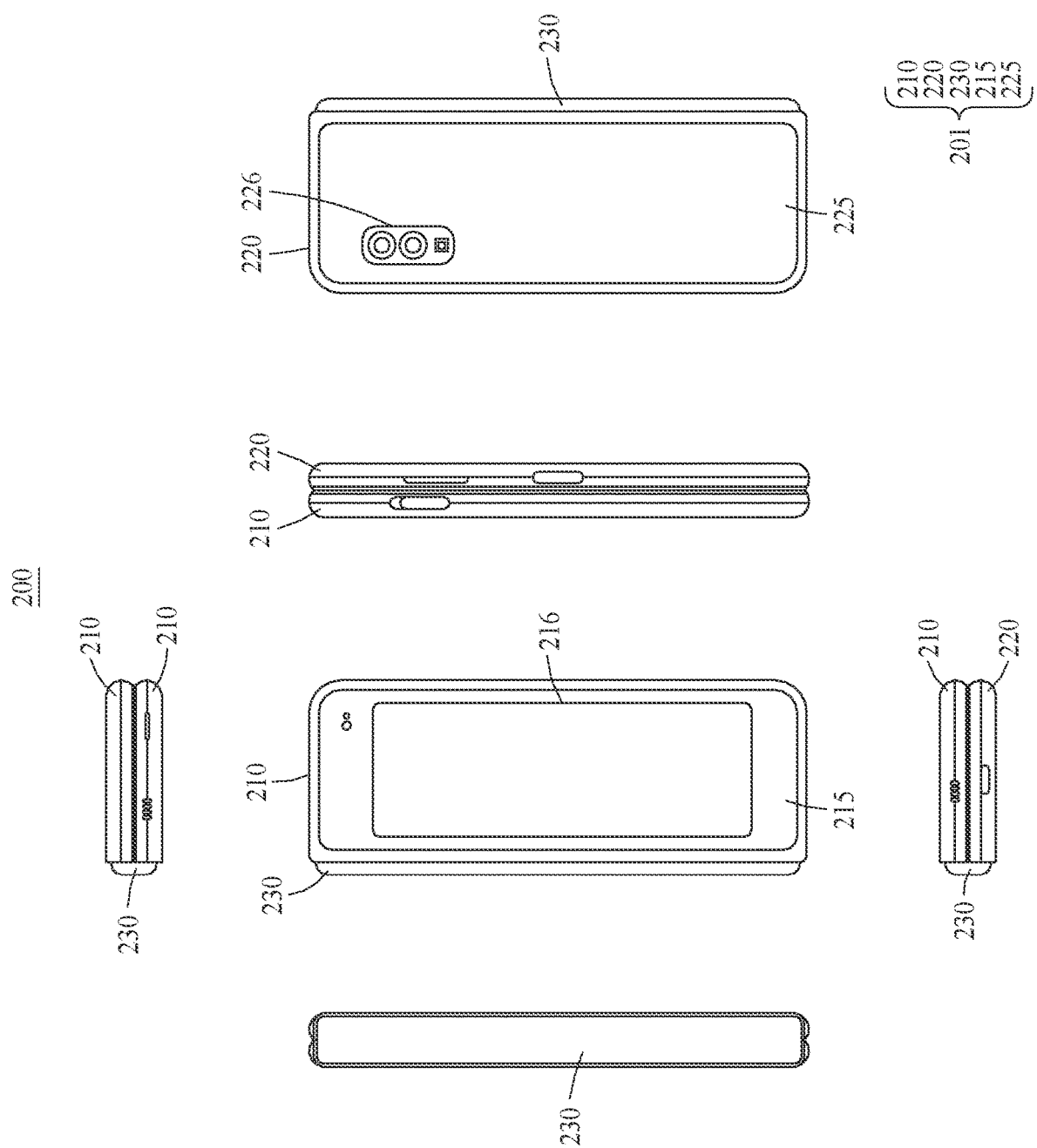
FIG. 2B is a diagram illustrating a folded state of the electronic device according to an embodiment.
Figure 2C:
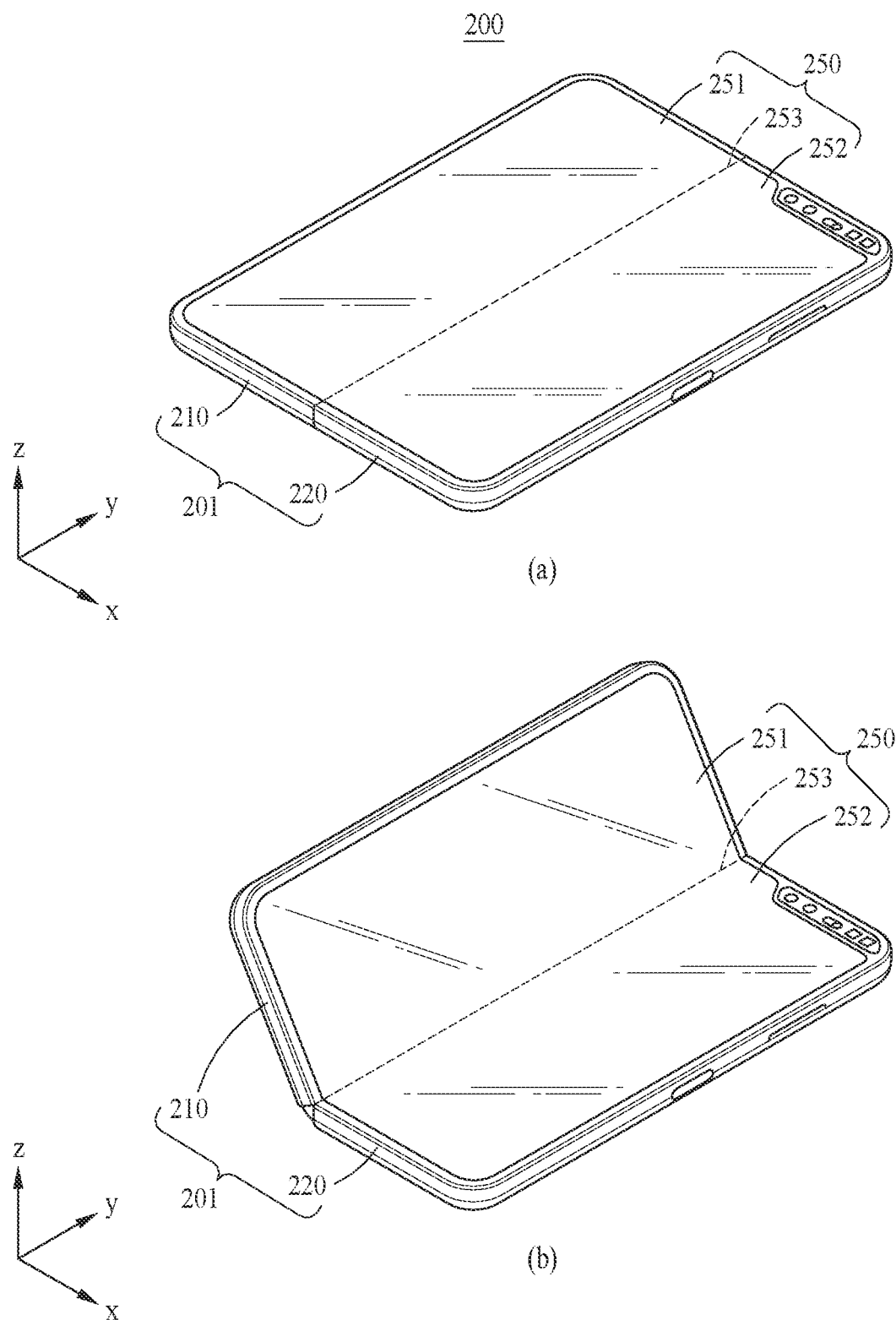
FIG. 2C is a perspective view illustrating an example of a fully unfolded state or a partially unfolded intermediate state of the electronic device according to an embodiment.

FIG. 2A is a diagram illustrating an unfolded state of an electronic device 200 according to an embodiment. FIG. 2B is a diagram illustrating a folded state of the electronic device 200 according to an embodiment. FIG. 2C is a perspective view illustrating an example of a fully unfolded state or a partially unfolded intermediate state of the electronic device 200 according to an embodiment.

The electronic device 200 of FIGS. 2A to 2C is an example of the electronic device 101 of FIG. 1 and may be a foldable or bendable electronic device.

A spatial coordinate system defined by an X-axis, a Y-axis, and a Z-axis that are orthogonal to each other is illustrated in FIG. 2C and the following drawings. The X-axis may represent a width direction of an electronic device, the Y-axis may represent a length direction of the electronic device, and the Z-axis may represent a height (or thickness) direction of the electronic device. In the following description, a "first direction" may refer to a direction parallel to the Z-axis.

Referring to FIGS. 2A and 2B, in an embodiment, the electronic device 200 may include a foldable housing 201, and a flexible or foldable display 250 (hereinafter, the "display" 250) (e.g., the display module 160 of FIG. 1) in a space formed by the foldable housing 201. A surface on which the display 250 is (or a surface on which the display 250 is viewed from the outside of the electronic device 200) may be defined as a front surface of the electronic device 200. In addition, a surface opposite to the front surface may be defined as a rear surface of the electronic device 200. In addition, a surface surrounding a space between the front surface and the rear surface may be defined as a side surface of the electronic device 200.

According to an embodiment, the foldable housing 201 may include a first housing structure 210, a second housing structure 220 including a sensor area 222, a first rear cover 215, a second rear cover 225, and a hinge structure 230. The hinge structure 230 may include a hinge cover 230 that covers or at least partially covers a foldable portion of the foldable housing 201. The foldable housing 201 of the electronic device 200 is not limited to the shape and combination illustrated in FIGS. 2A and 2B and may be implemented in a different shape or a different combination of components. For example, in an embodiment, the first housing structure 210 and the first rear cover 215 may be integrally formed, and the second housing structure 220 and the second rear cover 225 may be integrally formed.

According to an embodiment, the first housing structure 210 may be connected to the hinge structure 230 and may include a first surface facing a first direction, and a second surface facing a second direction opposite to the first direction. The second housing structure 220 may be connected to the hinge structure 230 and may include a third surface facing a third direction and a fourth surface facing a fourth direction opposite the third direction. The first housing structure 210 and the second housing structure 220 may fold with respect to each other through the hinge structure 230. A state of the electronic device 200 may be changed to a folded state or an unfolded state.

According to an embodiment, the first surface may face the third surface in a state in which the electronic device 200 is fully folded, and the third direction may be identical to the first direction in the fully unfolded state of the electronic device 200.

According to an embodiment, the first housing structure 210 and the second housing structure 220 may be on both sides of a folding axis A and may generally be symmetrical with respect to the folding axis A. As to be described hereinafter, an angle or distance between the first housing structure 210 and the second housing structure 220 may vary depending on whether the electronic device 200 is in the unfolded state, the folded state, or an intermediate state (e.g., a partially folded state or a partially unfolded state). According to an embodiment, unlike the first housing structure 210, the second housing structure 220 may additionally include the sensor area 222, in which various sensors are arranged. However, the first housing structure 210 and the second housing structure 220 may have shapes symmetrical to each other in areas other than the sensor area 222.

According to an embodiment, as illustrated in FIG. 2A, the first housing structure 210 and the second housing structure 220 may together form a recess for accommodating the display 250. According to an embodiment, due to the sensor area 222, the recess may have at least two different widths in a direction perpendicular to the folding axis A. For example, the recess may have a first width w1 between a first portion 210a of the first housing structure 210 parallel to the folding axis A and a first portion 220a of the second housing structure 220 formed on a periphery of the sensor area 222, and a second width w2 formed by a second portion 210b of the first housing structure 210 and a second portion 220b of the second housing structure 220 not corresponding to the sensor area 222 and being parallel to the folding axis A. In this case, the second width w2 may be greater than the first width w1. According to an embodiment, the first portion 220a and the second portion 220b of the second housing structure 220 may be at different distances from the folding axis A. The widths of the recess are not limited to the shown example. According to an embodiment, the recess may have a plurality of widths due to the shape of the sensor area 222 or asymmetrical portions of the first housing structure 210 and the second housing structure 220. According to an embodiment, the sensor area 222 may have a predetermined area adjacent to one corner of the second housing structure 220. However, the arrangement, shape, and size of the sensor area 222 are not limited to the shown example. For example, in one embodiment, the sensor area 222 may be provided at another corner of the second housing structure 220 or in a predetermined area between an upper corner and a lower corner. In an embodiment, components embedded in the electronic device 200 to perform various functions may be exposed to the front surface of the electronic device 200 through the sensor area 222 or through one or more openings provided in the sensor area 222. In an embodiment, the components may include various types of sensors. The sensors may include, for example, at least one of a front camera, a receiver, or a proximity sensor. According to an embodiment, the sensor area 222 may not be included in the second housing structure 220 or may be formed at a position different from that shown.

According to an embodiment, at least a portion of the first housing structure 210 and the second housing structure 220 may be formed of a metal material or a non-metal material having a selected magnitude of rigidity to support the display 250. At least a portion of the first housing structure 210 and the second housing structure 220 formed of the metal material may provide a ground plane for the electronic device 200 and may be electrically connected to a ground line formed on a PCB in the foldable housing 201.

According to an embodiment, the first rear cover 215 may be on one side of the folding axis A on the rear surface of the electronic device 200 and may have, for example, a substantially rectangular periphery that may be enclosed by the first housing structure 210. Similarly, the second rear cover 225 may be on another side of the folding axis A on the rear surface of the electronic device 200 and may have a periphery that may be enclosed by the second housing structure 220.

According to an embodiment, the first rear cover 215 may be substantially symmetrical to the second rear cover 225 with respect to the folding axis A. However, the first rear cover 215 and the second rear cover 225 do not necessarily have mutually symmetrical shapes. For example, the electronic device 200 may include the first rear cover 215 and the second rear cover 225 in various shapes. In an embodiment, the first rear cover 215 may be formed integrally with the first housing structure 210, and the second rear cover 225 may be formed integrally with the second housing structure 220.

According to an embodiment, the first rear cover 215, the second rear cover 225, the first housing structure 210, and the second housing structure 220 may form a space for including various components (e.g., the PCB or a battery) of the electronic device 200. According to an embodiment, one or more components may be on or visually exposed through the rear surface of the electronic device 200. For example, at least a portion of a sub-display may be visually exposed through a first rear area 216 of the first rear cover 215. In an embodiment, one or more components or sensors may be visually exposed through a second rear area 226 of the second rear cover 225. In an embodiment, the sensors may include a proximity sensor and/or a rear camera.

According to an embodiment, a front camera exposed to the front surface of the electronic device 200 through one or more openings provided in the sensor area 222 or a rear camera exposed through the second rear area 226 of the second rear cover 225 may include one or more lenses, an image sensor, and/or an ISP. A flash may include, for example, a light emitting diode (LED) or a xenon lamp. In an embodiment, two or more lenses (e.g., IR camera, wide-angle, and telephoto lenses) and image sensors may be on one surface of the electronic device 200.

Referring to FIG. 2B, the hinge cover 230 may be between the first housing structure 210 and the second housing structure 220 to cover or at least partially cover internal components (e.g., the hinge structure 230). According to an embodiment, the hinge structure 230 may be covered or at least partially covered by a portion of the first housing structure 210 and a portion of the second housing structure 220 or may be exposed to the outside depending on a state (e.g., the unfolded state, the intermediate state, or the folded state) of the electronic device 200.

For example, when the electronic device 200 is in the unfolded state (e.g., the fully unfolded state) as illustrated in FIG. 2A, the hinge structure 230 may be covered or at least partially covered by the first housing structure 210 and the second housing structure 220 and may not be exposed. For another example, when the electronic device 200 is in the folded state (e.g., a fully folded state), as illustrated in FIG. 2B, the hinge structure 230 may be exposed to the outside between the first housing structure 210 and the second housing structure 220. For another example, when the first housing structure 210 and the second housing structure 220 are in the intermediate state of being folded at a predetermined angle, at least a portion of the hinge cover 230 may be exposed to the outside between the first housing structure 210 and the second housing structure 220. In this case, the exposed area may be less than an area exposed in the fully folded state. In an embodiment, the hinge cover 230 may have a curved surface.

According to an embodiment, the display 250 may be in a space formed by the foldable housing 201. For example, the display 250 may sit in the recess formed by the foldable housing 201 and may be viewed from the outside through the front surface of the electronic device 200. For example, the display 250 may constitute most of the front surface of the electronic device 200. Accordingly, the front surface of the electronic device 200 may include the display 250 and a partial area of the first housing structure 210 and a partial area of the second housing structure 220, which are adjacent to the display 250. In addition, the rear surface of the electronic device 200 may include the first rear cover 215, a partial area of the first housing structure 210 adjacent to the first rear cover 215, the second rear cover 225, and a partial area of the second housing structure 220 adjacent to the second rear cover 225.

According to an embodiment, the display 250 may refer to a display having at least a partial area that is transformable into a flat surface or a curved surface. According to an embodiment, the display 250 may include a folding area 253, a first area 251 that is on one side of the folding area 253 (e.g., on the left side of the folding area 253 illustrated in FIG. 2A), and a second area 252 that is on the other side of the folding area 253 (e.g., on the right side of the folding area 253 illustrated in FIG. 2A).

However, such area division of the display 250 as illustrated in FIG. 2A is only an example, and the display 250 may be divided into a plurality of areas (e.g., four or more areas or two areas) depending on a structure or functions thereof. For example, as illustrated in FIG. 2A, the display 250 may be divided into areas based on the folding area 253 extending in parallel to the folding axis A. For another example, the display 250 may be divided into areas based on another folding axis (e.g., a folding axis parallel to a width direction of an electronic device).

According to an embodiment, the display 250 may be coupled to or adjacent to a touch panel including a touch sensing circuit and a pressure sensor for measuring a strength (a pressure) of a touch. For example, the display 250 may be coupled to or adjacent to a touch panel for detecting a stylus pen of an electromagnetic resonance (EMR) type, as an example of the touch panel.

According to an embodiment, the first area 251 and the second area 252 may have globally symmetrical shapes around the folding area 253. However, unlike the first area 251, the second area 252 may include a notch cut according to the presence of the sensor area 222 but may have a symmetrical shape to the first area 251 in the other areas. In other words, the first area 251 and the second area 252 may include mutually symmetrical portions and mutually asymmetrical portions.

According to an embodiment, the edge thickness of each of the first area 251 and the second area 252 may be different from the edge thickness of the folding area 253. The edge thickness of the folding area 253 may be less than those of the first area 251 and the second area 252. For example, the first area 251 and the second area 252 may be asymmetrical in terms of thickness when viewed in cross-section. For example, an edge of the first area 251 may have a first radius of curvature, and an edge of the second area 252 may have a second radius of curvature different from the first radius of curvature. For another example, the first area 251 and the second area 252 may be symmetrical in terms of thickness when viewed in cross-section.

Hereinafter, each area of the display 250 and operations of the first housing structure 210 and the second housing structure 220 depending on the state (e.g., the folded state, the unfolded state, or the intermediate state) of the electronic device 200 are described.

According to an embodiment, when the electronic device 200 is in the unfolded state (e.g., FIG. 2A), the first housing structure 210 and the second housing structure 220 may face the same direction while forming an angle of 180 degrees. The surface of the first area 251 and the surface of the second area 252 of the display 250 may face the same direction (e.g., a front direction of an electronic device) while forming 180 degrees. The folding area 253 may form the same plane in conjunction with the first area 251 and the second area 252.

According to an embodiment, when the electronic device 200 is in the folded state (e.g., FIG. 2B), the first housing structure 210 and the second housing structure 220 may face each other. The surface of the first area 251 and the surface of the second area 252 of the display 250 may face each other while forming a narrow angle (e.g., between 0 degrees to 10 degrees). At least a portion of the folding area 253 may form a curved surface having a predetermined curvature.

According to an embodiment, when the electronic device 200 is in the intermediate state, the first housing structure 210 and the second housing structure 220 may form a predetermined angle therebetween. The surface of the first area 251 and the surface of the second area 252 of the display 250 may form an angle greater than that in the folded state and smaller than that in the unfolded state. At least a portion of the folding area 253 may include a curved surface having a predetermined curvature, and the curvature may be smaller than that in the folded state.

The upper part of FIG. 2C illustrates the fully unfolded state of the electronic device 200, and the lower part of FIG. 2C illustrates the intermediate state in which the electronic device 200 is partially unfolded. As described above, the state of the electronic device 200 may be changed to the folded state or the unfolded state. According to an embodiment, when viewed in a direction of a folding axis (e.g., the axis A of FIG. 2A), the electronic device 200 may be folded in two types, i.e., an "in-folding" type in which the front surface of the electronic device 200 is folded to form an acute angle and an "out-folding" type in which the front surface of the electronic device 200 is folded to form an obtuse angle. For example, in the state in which the electronic device 200 is folded in the in-folding type, the first surface of the first housing structure 210 may face the third surface of the second housing structure 220. In the fully unfolded state, the first surface of the first housing structure 210 and the third surface of the second housing structure 220 may face the same direction (e.g., a direction parallel to the Z-axis).

For another example, when the electronic device 200 is folded in the out-folding type, the second surface of the first housing structure 210 may face the fourth surface of the second housing structure 220.

In addition, although not shown in the drawings, the electronic device 200 may include a plurality of hinge axes (e.g., two parallel hinge axes including the axis A of FIG. 2A and another axis parallel to the axis A). In this example, the electronic device 200 may also be folded in a "multi-folding" type in which the in-folding type and the out-folding type are combined.

The in-folding type may refer to a state in which the display 250 is not exposed to the outside in the fully folded state. The out-folding type may refer to a state in which the display 250 is exposed to the outside in the fully folded state. The lower part of FIG. 2C illustrates the intermediate state in which the electronic device 200 is partially unfolded in an in-folding process.

Although the state in which the electronic device 200 is folded in the in-folding type is described below for convenience of explanation, the description may be similarly applied in the state in which the electronic device 200 is folded in the out-folding type.

The electronic device according to the embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B or C", "at least one of A, B and C", and "at least one of A, B, or C", may include any one of, or all possible combinations of the items enumerated together in a corresponding one of the phrases. As used herein, such terms as "1st" and "2nd," or "first" and "second" may be used to simply distinguish a corresponding component from another and does not limit the components in other aspect (e.g., importance or order). It is to be understood that if a component (e.g., a first component) is referred to, with or without the term "operatively" or "communicatively", as "coupled with", "coupled to", "connected with", or "connected to" another component (e.g., a second component), it means that the component may be coupled with the other component directly (e.g., by wire), wirelessly, or via a third component.

As used in connection with embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3A:
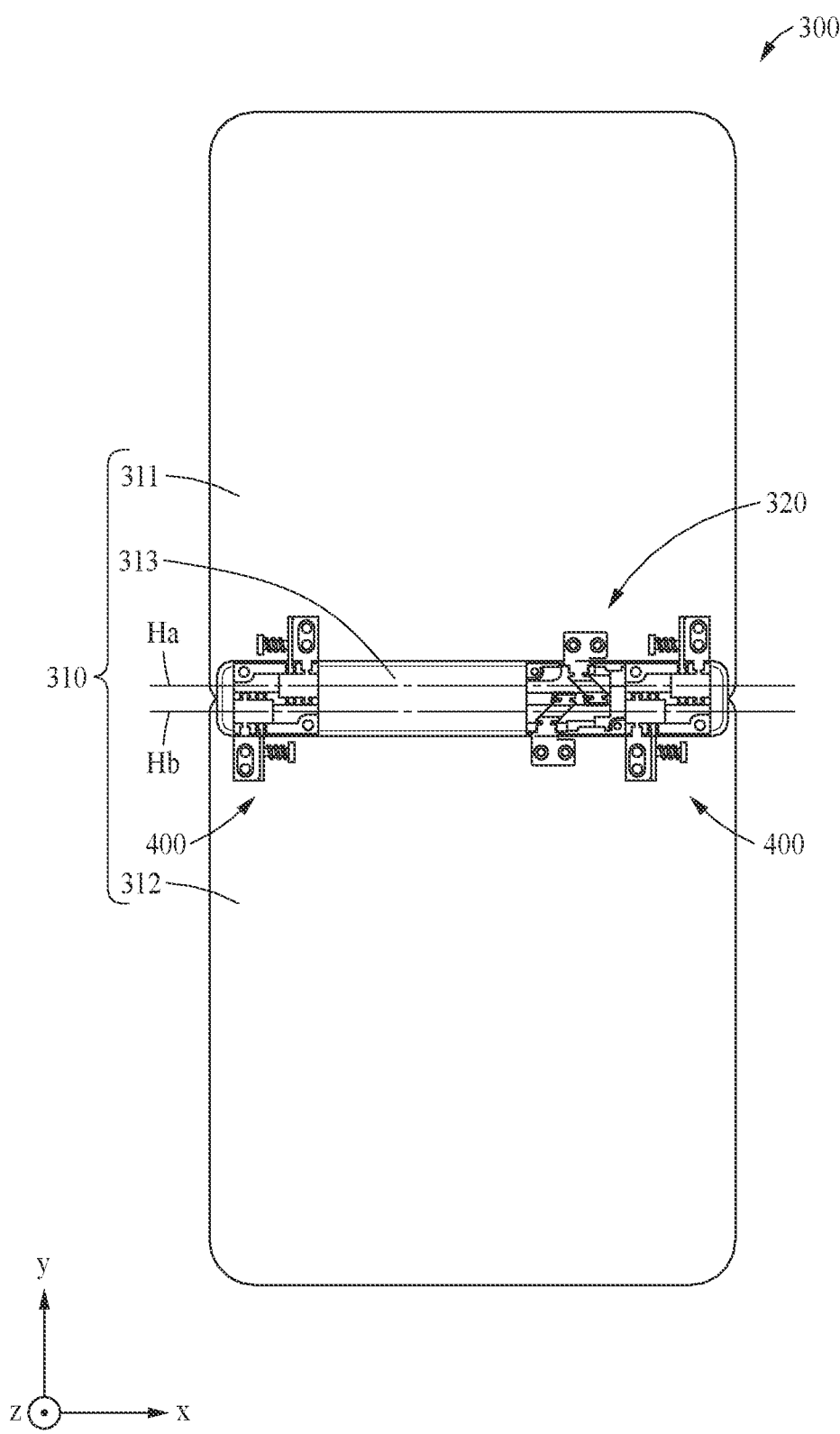
FIG. 3A is a front view illustrating an electronic device including a hinge assembly according to an embodiment.

FIG. 3A is a front view illustrating an electronic device including a hinge assembly according to an embodiment.

Referring to FIG. 3A, an electronic device 300 (e.g., the electronic device 101 of FIG. 1 or the electronic device 200 of FIGS. 2A to 2C) according to an embodiment may be a foldable electronic device. For example, the electronic device 300 may be folded or unfolded about two hinge axes Ha and Hb. However, FIG. 3A is only an example, and the size, shape, structure, and hinge axes of the electronic device 300 are not limited thereto. For example, the electronic device 300 of FIG. 3A may include the hinge axis Ha or Hb in an X-axis direction, which is a short side direction, but an electronic device according to an embodiment may also include a hinge axis Ha or Hb in a Y-axis direction, which is a long side direction.

The electronic device 300 according to an embodiment may include a housing 310 (e.g., the foldable housing 201 of FIGS. 2A to 2C), a display (e.g., the display module 160 of FIG. 1 or the display 250 of FIGS. 2A to 2C), a hinge assembly 400, and a sync assembly 320.

In an embodiment, the housing 310 may form at least a portion of the exterior of the electronic device 300. The housing 310 may include a first housing 311 (e.g., the first housing structure 210 of FIGS. 2A to 2C), a second housing 312 (e.g., the second housing structure 220 of FIGS. 2A to 2C), and a hinge housing 313.

In an embodiment, the first housing 311 and the second housing 312 may be foldably connected to each other by the hinge assembly 400. An angle or distance between the first housing 311 and the second housing 312 may vary depending on whether the electronic device 300 is in a flat state or unfolded state, a folded state, or an intermediate state. The intermediate state described above may include all states between the unfolded state and the folded state. The hinge housing 313 may be between the first housing 311 and the second housing 312 to provide a space for arranging internal components (e.g., the hinge assembly 400 and/or the sync assembly 320).

In an embodiment, the first housing 311 and the second housing 312 may provide a space for arranging the display 250. The display 250 may be, for example, a foldable flexible display. For example, the display 250 may include a first area (e.g., the first area 251 of FIG. 2C), a second area (e.g., the second area 252 of FIG. 2C), and a folding area (e.g., the folding area 253 of FIG. 2C) that is between the first area and the second area. The first housing 311 may be at a position corresponding to that of the first area 251 of the display 250 to support the first area 251 of the display 250. The second housing 312 may be at a position corresponding to that of the second area 252 of the display 250 to support the second area 252 of the display 250.

In an embodiment, the hinge assembly 400 may be between the first housing 311 and the second housing 312 to connect the first housing 311 to the second housing 312. For example, the hinge structure 230 of FIG. 2B may include a plurality of hinge assemblies 400. The plurality of hinge assemblies 400 may be spaced apart from one another along the hinge axis Ha or Hb. For example, as illustrated in FIG. 3A, two hinge assemblies 400 may be spaced apart from each other along the hinge axis Ha or Hb, but the number of hinge assemblies 400 is not limited thereto. The hinge assembly 400 may implement folding or unfolding operations of the electronic device 300. The hinge assembly 400 may operate between the folded state and the unfolded state, in which the first area 251 and the second area 252 face each other in the folded state, and the first area 251 and the second area 252 do not face each other in the unfolded state. The hinge assembly 400 may generate a force to maintain a predetermined folded state of the electronic device 300. For example, when the electronic device 300 is in the folded state, the hinge assembly 400 may generate a force to maintain the folded state of the electronic device 300. When the electronic device 300 is in the unfolded state, the hinge assembly 400 may generate a force to maintain the unfolded state of the electronic device 300. When the electronic device 300 is in the intermediate state, the hinge assembly 400 may generate a force to maintain the intermediate state of the electronic device 300. The hinge assembly 400 is further described below.

In an embodiment, the sync assembly 320 may be between the first housing 311 and the second housing 312 and may synchronize folding angles between the first housing 311 and the second housing 312.

Figure 3B:
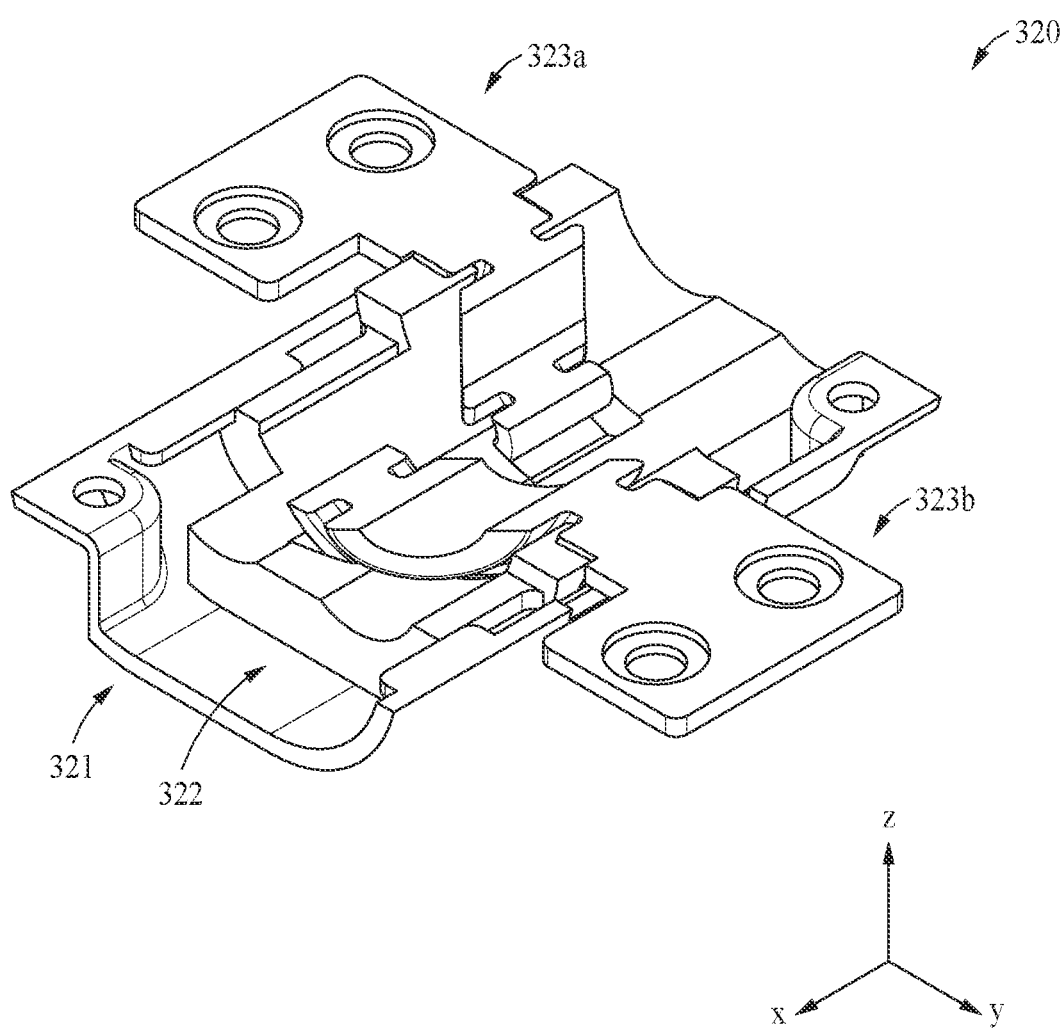
FIG. 3B is a perspective view illustrating an unfolded state of a sync assembly according to an embodiment.
Figure 3C:
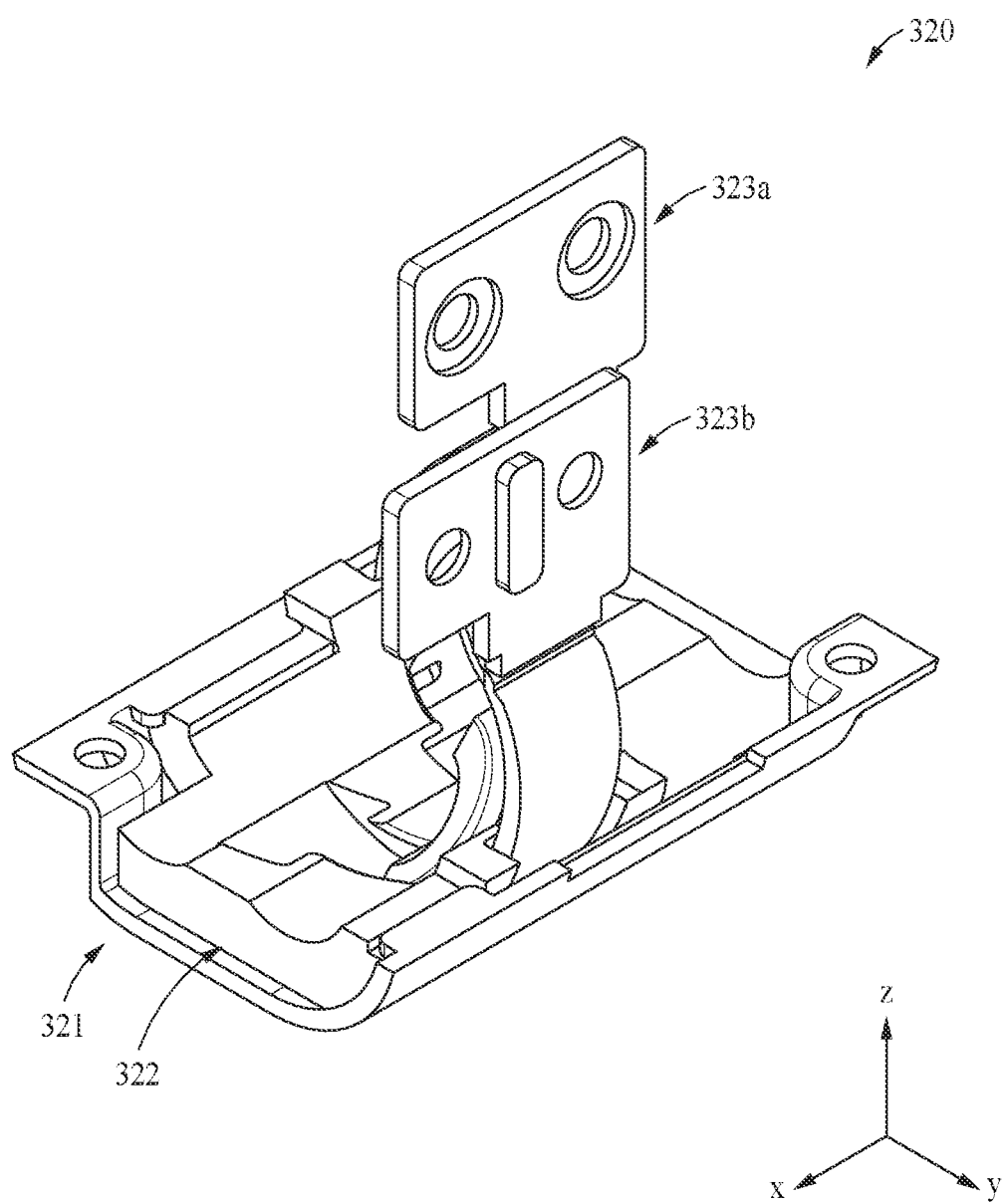
FIG. 3C is a perspective view illustrating a folded state of the sync assembly according to an embodiment.
Figure 3D:
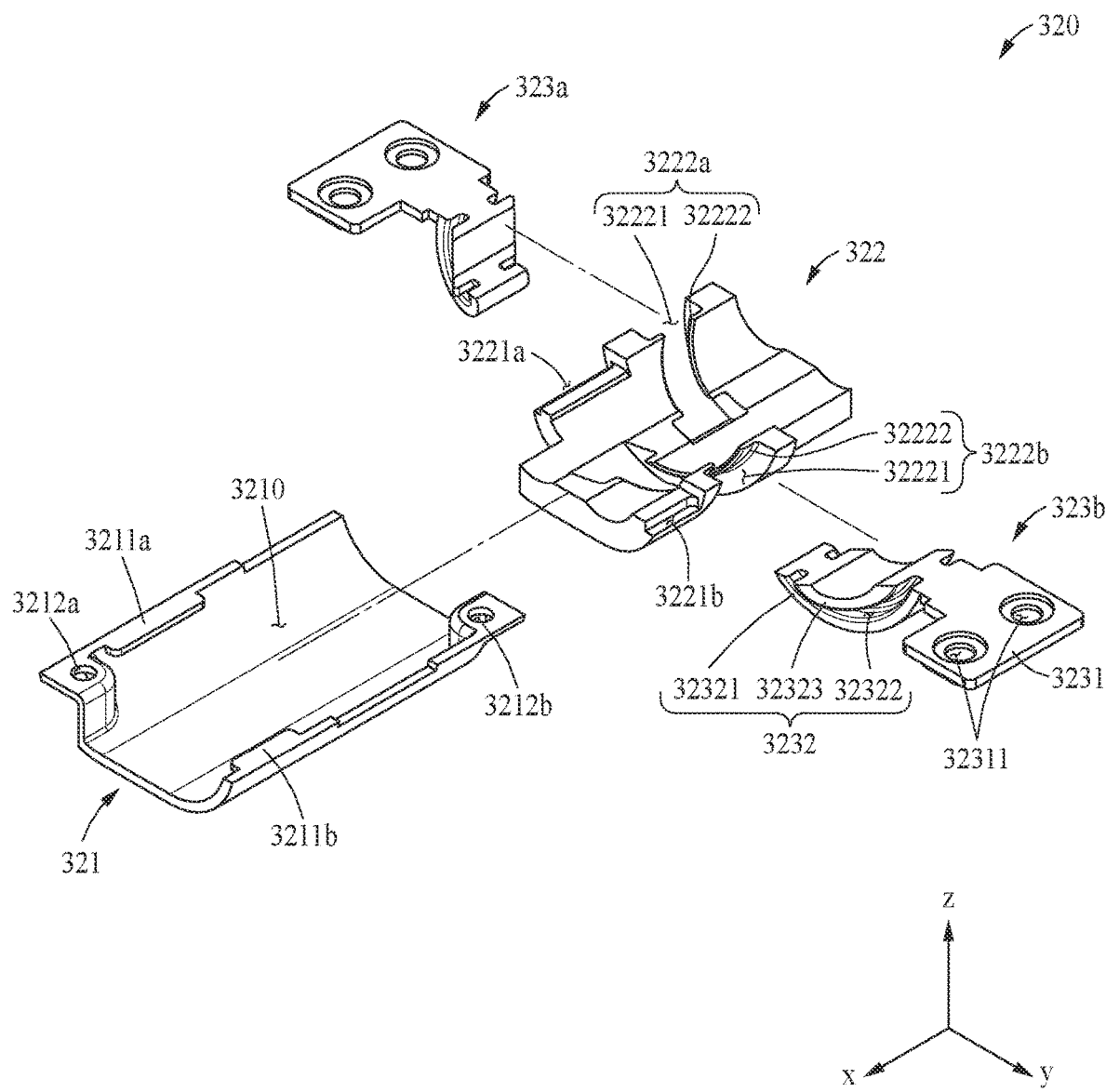
FIG. 3D is an exploded perspective view illustrating the sync assembly according to an embodiment.
Figure 3E:
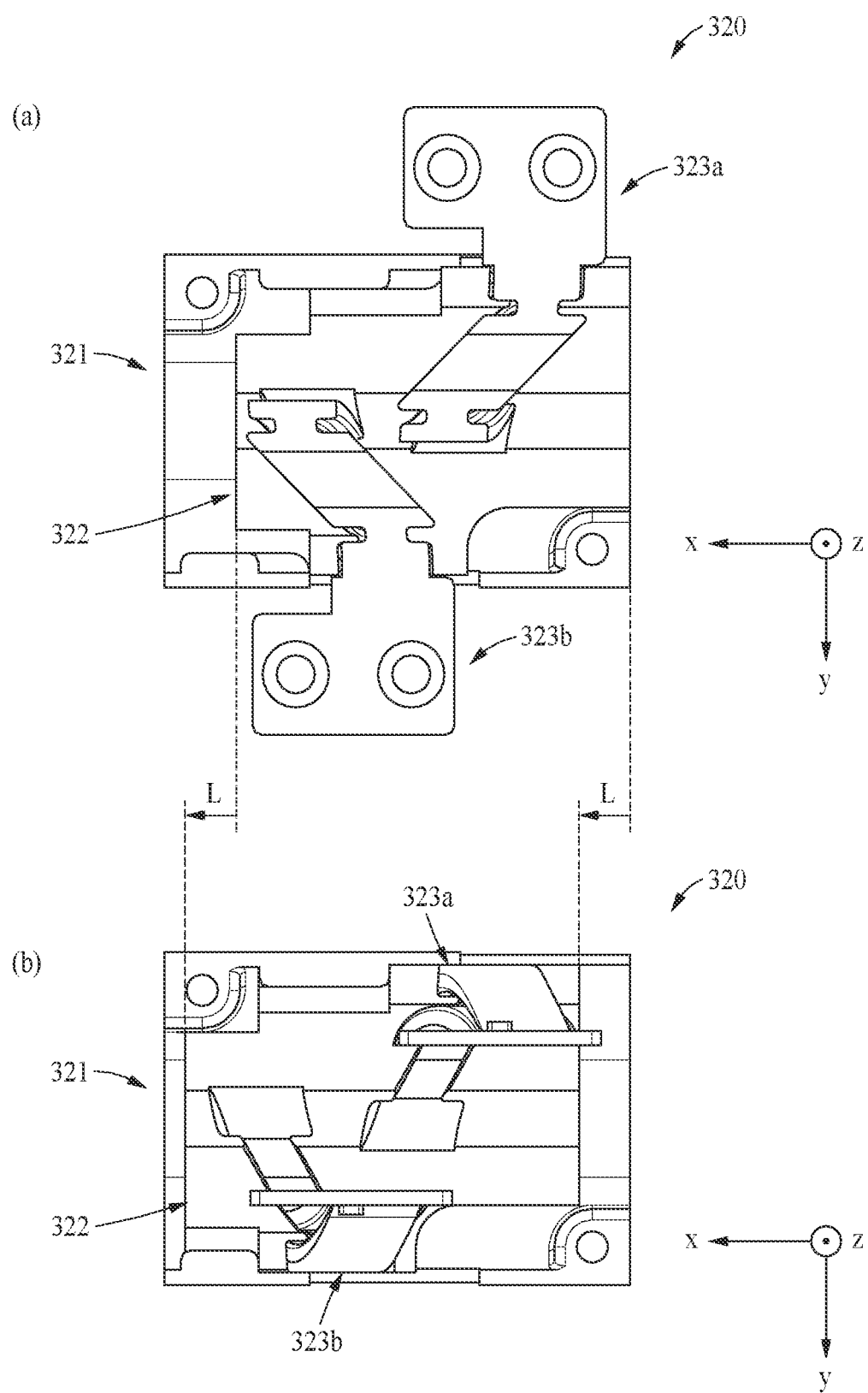
FIG. 3E is a front view illustrating an unfolded state and a folded state of the hinge assembly according to an embodiment.

FIG. 3B is a perspective view illustrating an unfolded state of a sync assembly according to an embodiment. FIG. 3C is a perspective view illustrating a folded state of the sync assembly according to an embodiment. FIG. 3D is an exploded perspective view illustrating the sync assembly according to an embodiment. FIG. 3E is a front view illustrating an unfolded state and a folded state of the hinge assembly according to an embodiment.

Referring to FIGS. 3A to 3E, a sync assembly 320 according to an embodiment may include a bracket 321, a slider 322, and two rotators 323a and 323b.

In an embodiment, the bracket 321 may be between the first housing 311 and the second housing 312. For example, the bracket 321 may be fixedly connected to a hinge housing 313. At least a portion of a lower surface (e.g., a surface facing a −Z-axis direction) of the bracket 321 may have a curved surface. For example, the lower surface of the bracket 321 may correspond to the shape of the interior of the hinge housing 313. At least a portion of an upper surface (e.g., a surface facing a +Z-axis direction) of the bracket 321 may have a flat surface. At least a portion of both side edges (e.g., an edge in the −Y-axis direction and an edge in the +Y-axis direction) of the bracket 321 may be curved or bent in an upward direction (e.g., the +Z-axis direction) to form a seating place 3210 for seating the slider 322.

In an embodiment, the bracket 321 may include two first slide structures 3211a and 3211b such that the slider 322 may slide with respect to the bracket 321. The two first slide structures 3211a and 3211b may provide a path for the slider 322 to slide with respect to the bracket 321. For example, the two first slide structures 3211a and 3211b may be formed in a longitudinal direction (e.g., the X-axis direction) parallel to two hinge axes Ha and Hb. For example, the two first slide structures 3211a and 3211b may protrude by a predetermined length in a direction (e.g., the +Y-axis direction and the −Y-axis direction, respectively) facing each other in at least some sections (e.g., some sections in the X-axis direction) of both side edges (e.g., the edge in the −Y-axis direction and the edge in the +Y-axis direction) of the bracket 321. However, the foregoing descriptions of the first slide structures 3211a and 3211b are examples, and the shape and/or position of the first slide structures 3211a and 3211b are not limited thereto.

In an embodiment, the bracket 321 may include two bracket fixing holes 3212a and 3212b to fix the bracket 321 to the hinge housing 313. For example, a fastening member (e.g., a screw, a bolt, a pin, and/or a combination fastening structure) may be inserted into each of the two bracket fixing holes 3212a and 3212b. The two bracket fixing holes 3212a and 3212b may diagonally face each other. For example, the two bracket fixing holes 3212a and 3212b may be substantially point-symmetric with respect to the center of the bracket 321 when the bracket 321 is viewed from the front side.

In an embodiment, the slider 322 may be connected to the bracket 321 such that the slider 322 may linearly move in a direction of the hinge axis Ha or Hb.

In an embodiment, the slider 322 may include two second slide structures 3221a and 3221b interoperating with the two first slide structures 3211a and 3211b to be slidably connected to the bracket 321. The two second slide structures 3221a and 3221b may be formed in a shape corresponding to the two first slide structures 3211a and 3211b. For example, the two second slide structures 3221a and 3221b may be recessed in a shape corresponding to the two first slide structures 3211a and 3211b such that the two first slide structures 3211a and 3211b may be respectively inserted into the two second slide structures 3221a and 3221b. For example, the two second slide structures 3221a and 3221b may be recessed by a predetermined length in a direction (e.g., the +Y-axis direction and the −Y-axis direction, respectively) facing each other in at least some sections (e.g., some sections in the X-axis direction) of both side edges (e.g., an edge in the −Y-axis direction and an edge in the +Y-axis direction) of the slider 322. The first slide structure 3211a or 3211b may be slidably inserted into the second slide structure 3221a or 3221b, and the slider 322 may be slidably connected to the bracket 321. However, the foregoing descriptions of the second slide structures 3221a and 3221b are examples, and the shape and/or position of the second slide structures 3221a and 3221b are not limited thereto. For example, the two first slide structures 3211a and 3211b may be recessed, and the two second slide structures 3221a and 3221b may protrude in a shape corresponding to the two first slide structures 3211a and 3211b.

In an embodiment, the slider 322 may include two first spiral structures 3222a and 3222b. The two first spiral structures 3222a and 3222b may be formed in a spiral shape about the two hinge axes Ha and Hb, respectively. The two first spiral structures 3222a and 3222b may be formed such that spiral directions thereof may be opposite to each other. For example, the first spiral structure 3222a may be formed in a spiral shape rotating in a counterclockwise direction about the +X-axis direction, and the other first spiral structure 3222b may be formed in a spiral shape rotating in a clockwise direction about the +X-axis direction. The two first spiral structures 3222a and 3222b may be formed respectively on both sides (e.g., the −Y-axis direction and the +Y-axis direction) of the slider 322. For example, the two first spiral structures 3222a and 3222b may be in a diagonal direction to each other. For example, the first spiral structure 3222a may be formed at a position relatively biased in the −Y-axis direction and/or the −X-axis direction compared to the other first spiral structure 3222b, and the other first spiral structure 3222b may be formed at a position relatively biased in the +Y-axis direction and/or the +X-axis direction compared to the first spiral structure 3222a. However, the foregoing descriptions of the first spiral structures 3222a and 3222b are only examples, and the shape and/or position of the first spiral structures 3222a and 3222b are not limited thereto.

In an embodiment, the two first spiral structures 3222a and 3222b may respectively include a first spiral groove 32221 and a first spiral protrusion 32222. The first spiral groove 32221 may be a groove formed in a spiral shape. The first spiral protrusion 32222 may protrude from both side surfaces (e.g., a surface facing the −X-axis direction and a surface facing the +X-axis direction) of the first spiral groove 32221 in a direction (e.g., the +X-axis direction and the −X-axis direction, respectively) facing each other. For example, the first spiral protrusion 32222 may be formed at an upper edge (e.g., an edge in the +Z-axis direction) of both side surfaces (e.g., the surface facing the −X-axis direction and the surface facing the +X-axis direction) of the first spiral groove 32221. However, the foregoing descriptions of the first spiral groove 32221 and the first spiral protrusion 32222 are only examples, and the shape and/or position of the first spiral groove 32221 and the first spiral protrusion 32222 are not limited thereto.

In an embodiment, one side of each of the two rotators 323a and 323b may be connected to the first housing 311 or the second housing 312, and the other side thereof may be rotatably connected to the two first spiral structures 3222a and 3222b formed on the slider 322, respectively.

In an embodiment, each of the two rotators 323a and 323b may include a rotator body 3231 and a second spiral structure 3232. The two rotators 323a and 323b may be symmetrical to each other. Hereinafter, as to the rotators 323a and 323b, the description is provided based on the rotator 323b for ease of description.

The rotator body 3231 may be formed in a plate shape. The rotator body 3231 may be fixedly connected to a first housing (e.g., the first housing 311 of FIG. 3A) or a second housing (e.g., the second housing 312 of FIG. 3A). The rotator body 3231 may be parallel to the front surface (e.g., the surface facing the +Z-axis direction about the state of FIG. 3A) of the first housing 311 or the second housing 312. At least one housing fixing hole 32311 for fixing the rotator body 3231 to the first housing 311 or the second housing 312 may be formed in the rotator body 3231. For example, the housing fixing hole 32311 may penetrate through the rotator body 3231 in the Z-axis direction. For example, a fastening member (e.g., a screw, a bolt, a pin, and/or a combination fastening structure) may be inserted into the housing fixing hole 32311. Although two housing fixing holes 32311 are illustrated in FIGS. 3A to 3E, this is only an example, and the number of housing fixing holes 32311 is not limited thereto.

In an embodiment, the second spiral structure may be formed at an edge of the rotator body 3231. For example, based on the rotator 323b of FIG. 3D, the second spiral structure 3232 may extend from an edge of the rotator body 3231 in the −Y-axis direction. The second spiral structure 3232 may protrude in a spiral shape. The second spiral structure 3232 may be formed in a shape corresponding to the first spiral structure 3222a or 3222b such that the second spiral structure 3232 may be inserted into the first spiral structure 3222a or 3222b of the slider 322. In a state in which the second spiral structure 3232 is inserted into the first spiral structure 3222a or 3222b, the rotator 323b may rotate about the hinge axis Ha or Hb in a predetermined angle range along the spiral shape that is formed by the first spiral structure 3222a or 3222b and the second spiral structure 3232.

In an embodiment, the second spiral structure 3232 may include a second spiral protrusion 32321, a second spiral groove 32322, and a cover 32323. The second spiral protrusion 32321 may be a part protruding in a spiral shape. The second spiral protrusion 32321 may be formed in a shape corresponding to the first spiral groove 32221 to be inserted into the first spiral groove 32221. The second spiral groove 32322 may be recessed from both side surfaces (e.g., a surface facing the −X-axis direction and a surface facing the +X-axis direction) of the second spiral protrusion 32321 in a recessing direction (e.g., the +X-axis direction and the −X-axis direction, respectively). For example, the second spiral groove 32322 may be formed at an upper side (e.g., a side in the +Z-axis direction) of both side surfaces (e.g., the surface facing the −X-axis direction and the surface facing the +X-axis direction) of the second spiral protrusion 32321. The second spiral groove 32322 may be formed in a shape corresponding to the first spiral protrusion 32222 such that the first spiral protrusion 32222 may be inserted into the second spiral groove 32322. The cover 32323 may be on a side (e.g., the side in the +Z-axis direction) upper than the second spiral groove 32322. The cover 32323 may have a width (e.g., a width in the X-axis direction) wider than the second spiral protrusion 32321. In a state in which the first spiral protrusion 32222 is inserted into the second spiral groove 32322, the cover 32323 may prevent the first spiral groove 32221 from deviating to an upper side (e.g., the +Z-axis direction) from the second spiral groove 32322. However, the foregoing descriptions of the second spiral protrusion 32321, the second spiral groove 32322, and the cover 32323 are only examples, and the shape and/or position of the second spiral protrusion 32321, the second spiral groove 32322, and the cover 32323 are not limited thereto.

In an embodiment, when the first housing 311 or the second housing 312 is folded with respect to the hinge axis Ha or Hb, the rotator 323a or 323b may rotate along the spiral shape that is formed by the first spiral structure 3222a or 3222b and the second spiral structure 3232 with respect to the slider 322. In a process where the rotator 323a or 323b rotates along the spiral shape, the slider 322 may linearly move in the direction of the hinge axis Ha or Hb by an axial direction length corresponding to a rotation angle of the spiral shape with respect to the bracket 321. For example, when switching from an unfolded state (e.g., the upper part of FIG. 3E) to a folded state (e.g., the lower part of FIG. 3E), the slider 322 may linearly move by a predetermined length L in the +X-axis direction with respect to the bracket 321. In this structure, the rotation of one of the two the rotators 323a and 323b may interoperate with the rotation of the other of the two the rotators 323a and 323b through the linear movement of the slider 322. As a result, a folding angle of the first housing 311 may be synchronized with a folding angle of the second housing 312 through the spiral rotation of the two rotators 323a and 323b and the linear movement of the slider 322 in the direction of the hinge axis Ha or Hb. However, the foregoing structure is only an example, and the structure of the sync assembly 320 is not limited thereto. For example, the sync assembly 320 may also synchronize the folding angles of the first housing 311 and the second housing 312 through a gear structure.

Figure 4A:
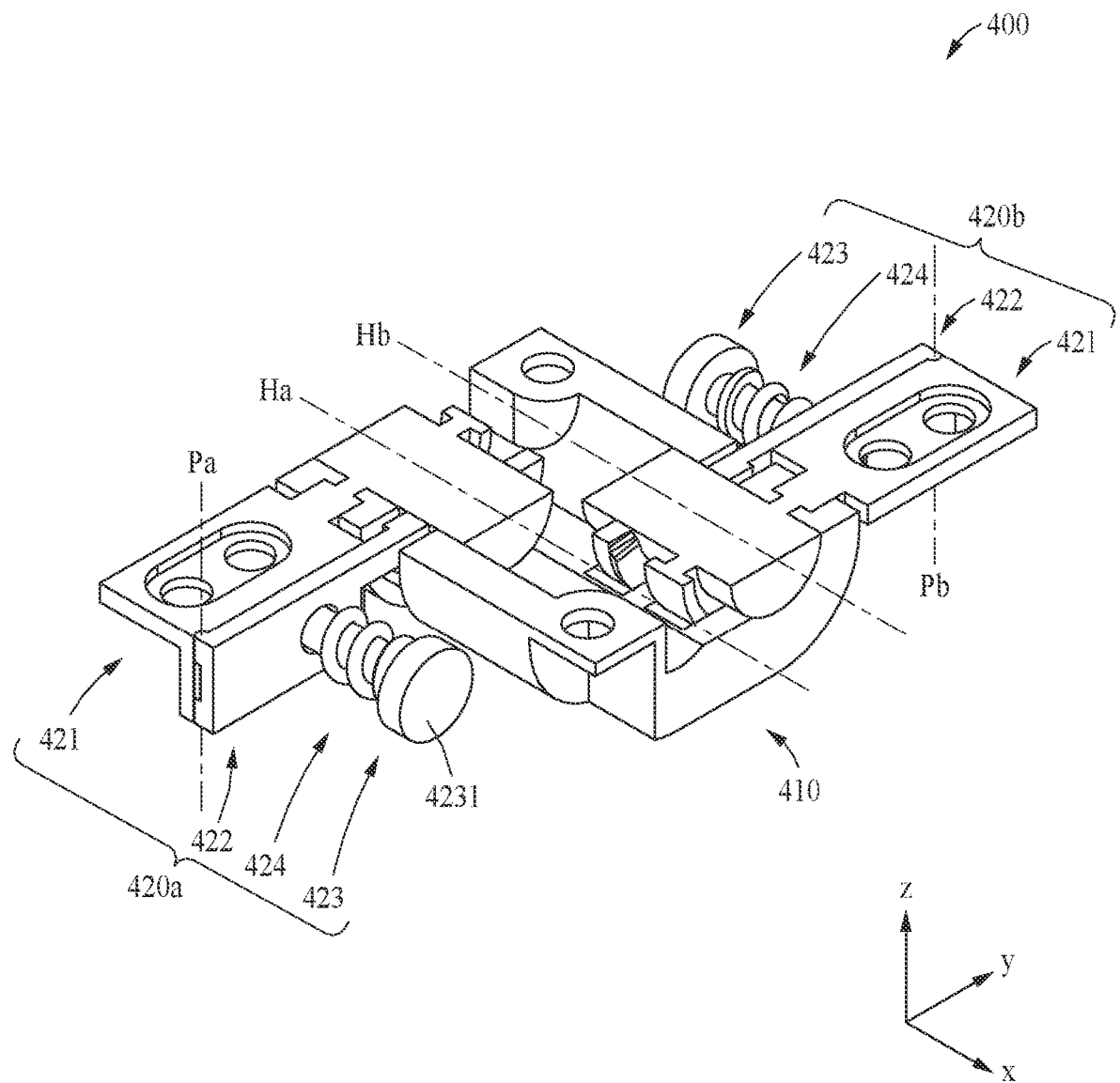
FIG. 4A is a perspective view illustrating an unfolded state of the hinge assembly according to an embodiment.
Figure 4B:
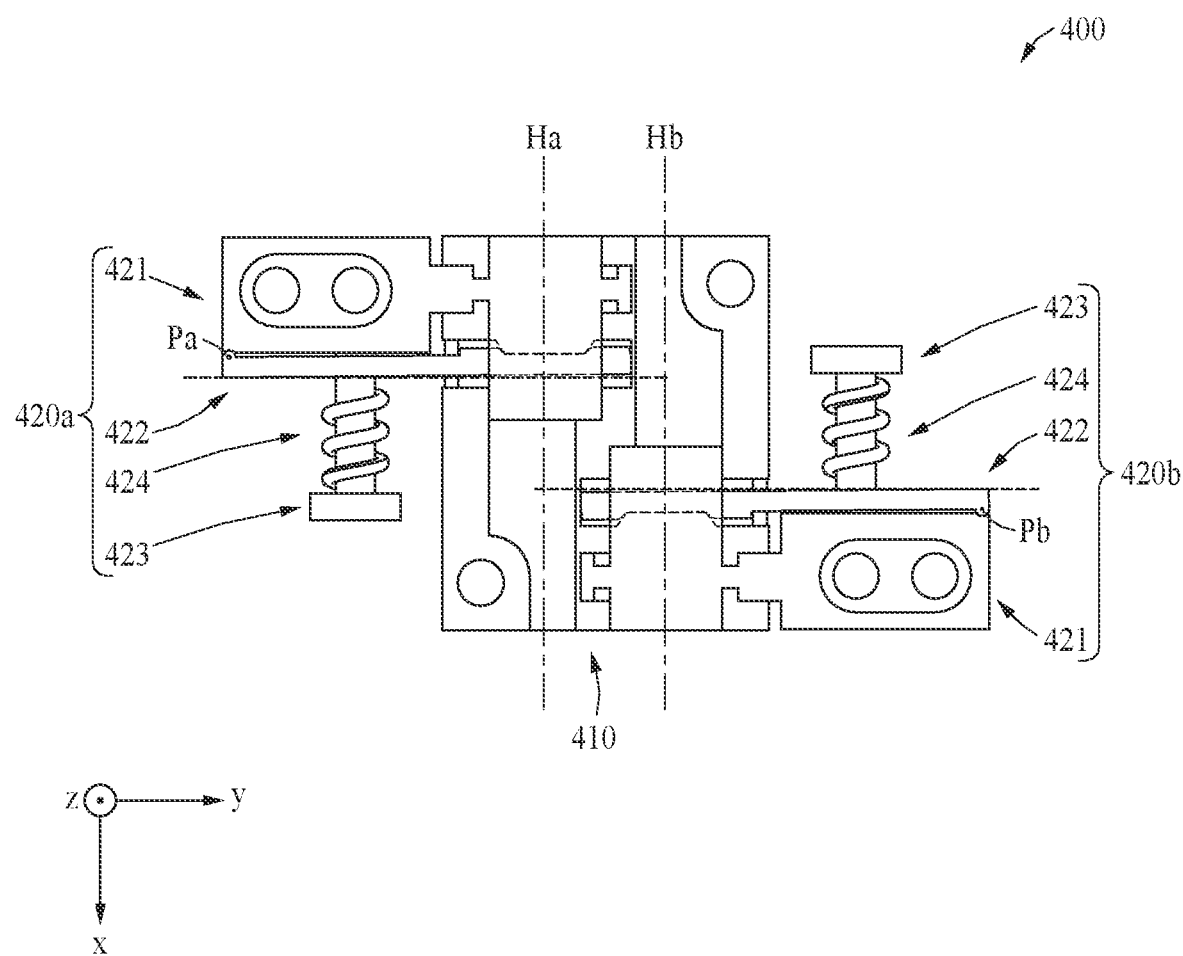
FIG. 4B is a front view illustrating an unfolded state of the hinge assembly according to an embodiment.
Figure 4C:
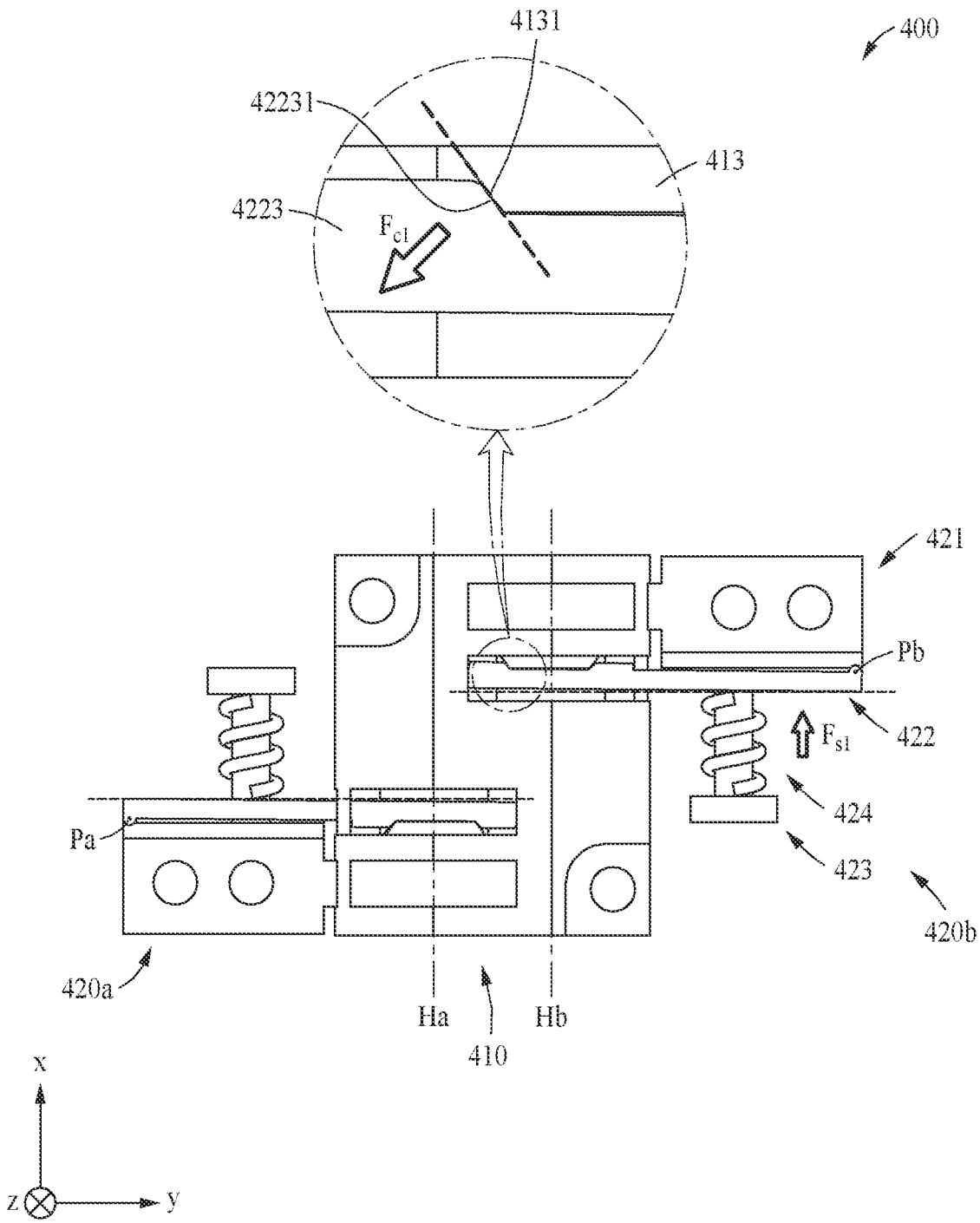
FIG. 4C is a rear view illustrating an unfolded state of the hinge assembly according to an embodiment.
Figure 4D:
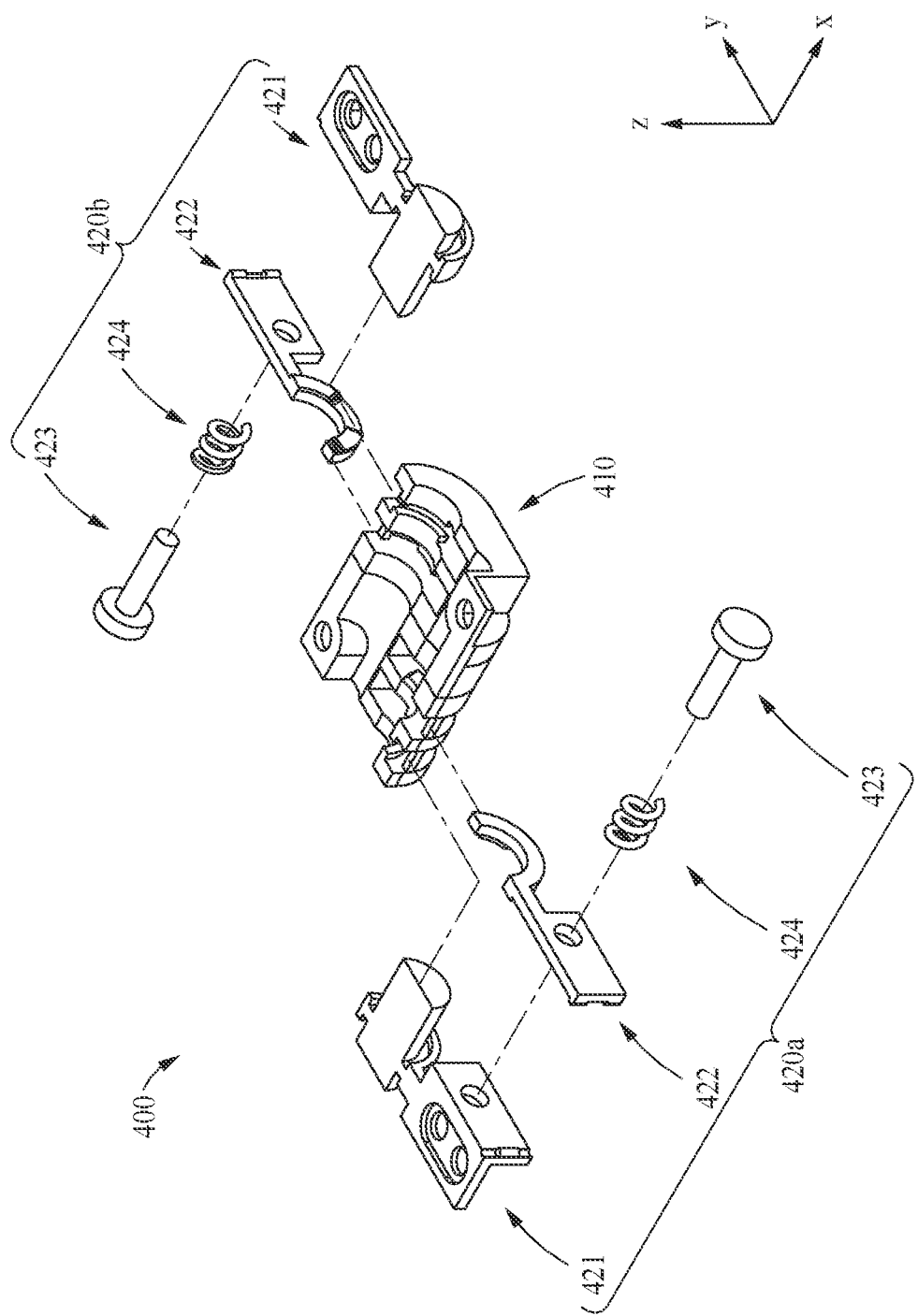
FIG. 4D is an exploded perspective view illustrating the hinge assembly according to an embodiment.
Figure 4E:
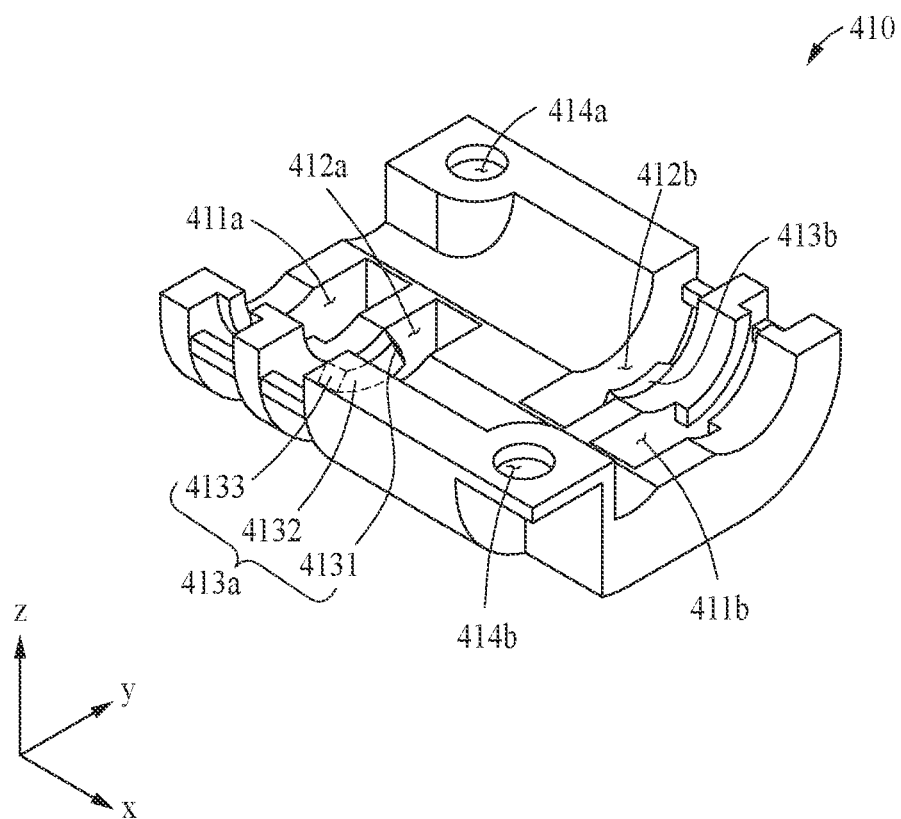
FIG. 4E is a perspective view illustrating a hinge bracket according to an embodiment.
Figure 4F:
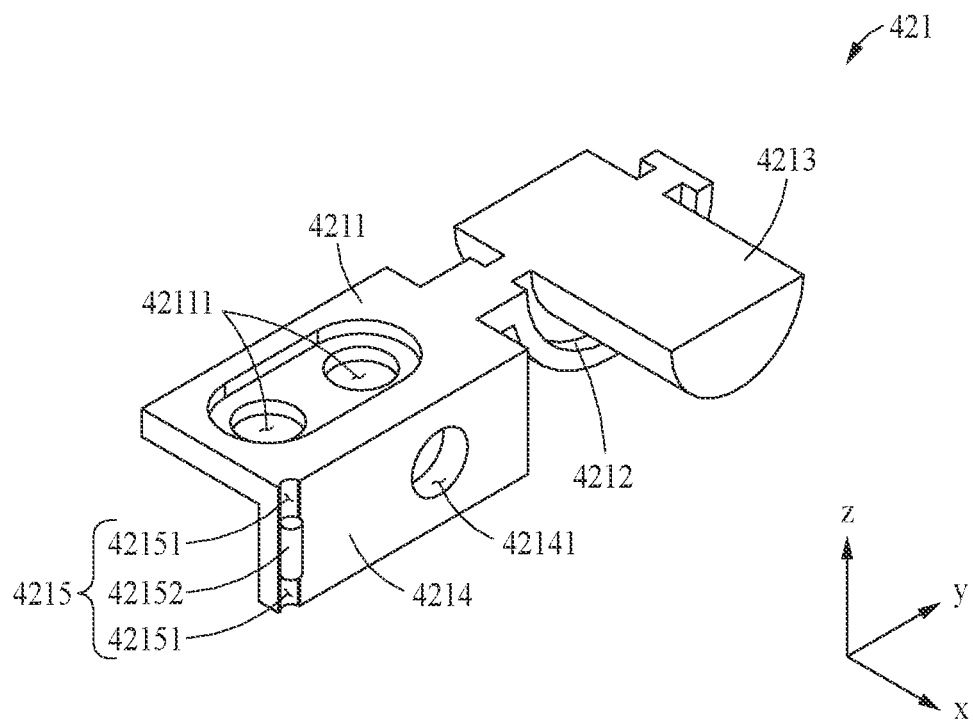
FIG. 4F is a perspective view illustrating a first hinge member according to an embodiment.
Figure 4G:
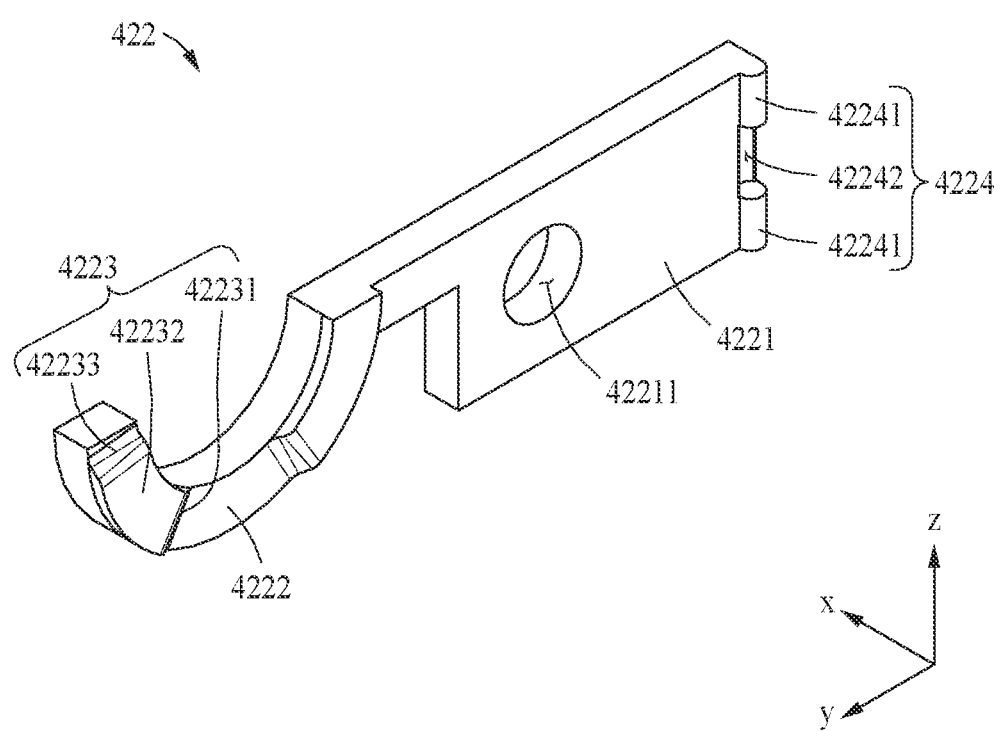
FIG. 4G is a perspective view illustrating a second hinge member according to an embodiment.

FIG. 4A is a perspective view illustrating an unfolded state of a hinge assembly according to an embodiment. FIG. 4B is a front view illustrating an unfolded state of the hinge assembly according to an embodiment. FIG. 4C is a rear view illustrating an unfolded state of the hinge assembly according to an embodiment. FIG. 4D is an exploded perspective view illustrating the hinge assembly according to an embodiment. FIG. 4E is a perspective view illustrating a hinge bracket according to an embodiment. FIG. 4F is a perspective view illustrating a first hinge member according to an embodiment. FIG. 4G is a perspective view illustrating a second hinge member according to an embodiment.

Referring to FIGS. 4A to 4G, a hinge assembly 400 according to an embodiment may include a hinge bracket 410 and two hinge structures 420a and 420b.

The hinge bracket 410 may be fixedly connected to a housing (e.g., the housing 310 of FIG. 3A). For example, the hinge bracket 410 may be fixedly connected to a hinge housing (e.g., the hinge housing 313 of FIG. 3A). At least a portion of a lower surface (e.g., a surface facing a −Z-axis direction) of the hinge bracket 410 may have a curved surface. For example, the lower surface of the hinge bracket 410 may correspond to the shape of the interior of the hinge housing 313. At least a portion of an upper surface (e.g., a surface facing a +Z-axis direction) of the hinge bracket 410 may have a flat surface.

In an embodiment, the hinge bracket 410 may include two first rail structures 411a and 411b, two detent grooves 412a and 412b, two fixed cams 413a and 413b, and two bracket fixing holes 414a and 414b.

In an embodiment, the hinge bracket 410 may include the two first rail structures 411a and 411b such that the two hinge structures 420a and 420b may be rotatably coupled. At least a portion of a cross-section of the two first rail structures 411a and 411b may have an arc shape in a direction from the upper surface (e.g., the surface facing the +Z-axis direction) to the lower surface (e.g., the surface facing the −Z-axis direction). For example, the two first rail structures 411a and 411b may be recessed in an arc shape at a predetermined angle. At least a portion of the hinge structure 420a or 420b may be inserted into the first rail structure 411a or 411b in a direction (e.g., a +Y-axis direction or a −Y-axis direction) perpendicular to a hinge axis (e.g., the hinge axis Ha or Hb of FIG. 3A). For example, a second rail structure 4212 of a first hinge member 421 of each of the two hinge structures 420a and 420b may be inserted into the two first rail structures 411a and 411b to interoperate with the two first rail structures 411a and 411b. The two first rail structures 411a and 411b may be diagonal to each other. For example, the two first rail structures 411a and 411b may be point-symmetric about the center of the hinge bracket 410 when the hinge bracket 410 is viewed from the front side. For example, the first rail structure 411a may be formed at a position relatively biased in a −X-axis direction and/or the −Y-axis direction compared to the other first rail structure 411b, and the other first rail structure 411b may be formed at a position relatively biased in a +X-axis direction and/or the +Y-axis direction compared to the first rail structure 411a. The arc shapes of the two first rail structures 411a and 411b may respectively define two hinge axes Ha and Hb. For example, the centers of the arc shapes of the two first rail structures 411a and 411b may be defined as the two hinge axes Ha and Hb. The two hinge axes Ha and Hb may be spaced apart from each other at a designated distance.

In an embodiment, the hinge bracket 410 may include the two detent grooves 412a and 412b. At least a portion of a cross-section of the two detent grooves 412a and 412b may have an arc shape in a direction from an upper surface (e.g., a surface facing the +Z-axis direction) to a lower surface (e.g., a surface facing the −Z-axis direction). The two detent grooves 412a and 412b may be parallel to the two first rail structures 411a and 411b. A portion of the two hinge structures 420a and 420b may respectively be inserted into the two detent grooves 412a and 412b in the direction (e.g., the +Y-axis direction or the −Y-axis direction) perpendicular to the hinge axis (e.g., the hinge axis Ha or Hb of FIG. 3A). For example, a detent structure 4222 of a second hinge member 422 of each of the two hinge structures 420a and 420b may be inserted into the two detent grooves 412a and 412b. The two detent grooves 412a and 412b may be diagonal to each other. For example, the two detent grooves 412a and 412b may be point-symmetric about the center of the hinge bracket 410 when the hinge bracket 410 is viewed from the front side. For example, the detent groove 412a may be adjacent and parallel to the first rail structure 411a, and the other detent groove 412b may be adjacent and parallel to the other first rail structure 411b. For example, the detent groove 412a may be formed at a position relatively biased in the +X-axis direction compared to the first rail structure 411a, and the other detent groove 412b may be formed at a position relatively biased in the −X-axis direction compared to the other first rail structure 411b.

In an embodiment, the hinge bracket 410 may include two fixed cams 413a and 413b respectively formed on one surface of the two detent grooves 412a and 412b. For example, the fixed cam 413a may be formed on a surface facing the +X-axis direction of the detent groove 412a, and the other fixed cam 413b may be formed on a surface facing the −X-axis direction of the other detent groove 412b. The two fixed cams 413a and 413b may be formed along an arc having the hinge axes Ha and Hb as a center. The two fixed cams 413a and 413b may each include at least one crest and/or trough structure. For example, each of the two fixed cams 413a and 413b may protrude to include a first inclined surface 4131, a first flat surface 4132, and a second inclined surface 4133.

In an embodiment, the hinge bracket 410 may include the two bracket fixing holes 414a and 414b to fix the hinge bracket 410 to the hinge housing 313. For example, a fastening member (e.g., a screw, a bolt, a pin, and/or a combination fastening structure) may be inserted into each of the two bracket fixing holes 414a and 414b. The two bracket fixing holes 414a and 414b may be diagonal to each other. For example, the two bracket fixing holes 414a and 414b may be point-symmetric about the center of the hinge bracket 410 when the hinge bracket 410 is viewed from the front side. For example, the bracket fixing hole 414a may be formed at a position relatively biased in the −X-axis direction and/or the +Y-axis direction compared to the other bracket fixing hole 414b, and the other bracket fixing hole 414b may be formed at a position relatively biased in the +X-axis direction and/or the −Y-axis direction compared to the bracket fixing hole 414a. For example, the two bracket fixing holes 414a and 414b may be in a diagonal direction that crosses the two first rail structures 411a and 411b.

In an embodiment, the two hinge structures 420a and 420b may be rotatably connected with respect to the hinge bracket 410. For example, the two hinge structures 420a and 420b may be rotatably connected to the two first rail structures 411a and 411b, respectively. The two hinge structures 420a and 420b may be diagonal to each other. For example, the two hinge structures 420a and 420b may be point-symmetric about the center of the hinge assembly 400 when the hinge assembly 400 is viewed from the front side.

In an embodiment, each of the two hinge structures 420a and 420b may include the first hinge member 421, the second hinge member 422, a pin member 423, and an elastic member 424.

In an embodiment, one side (e.g., a side in the −Y-axis direction in FIG. 4F) of the first hinge member 421 may be connected to a first housing (e.g., the first housing 311 of FIG. 3A) or a second housing (e.g., the second housing 312 of FIG. 3A), and the other side (e.g., a side in the +Y-axis direction in FIG. 4F) of the first hinge member 421 may be rotatably connected to the first rail structure 411a or 411b with respect to the hinge axis Ha or Hb.

In an embodiment, the first hinge member 421 may include a first hinge body 4211, the second rail structure 4212, a rotation guide 4213, an extension body 4214, and a first structure 4215.

In an embodiment, the first hinge body 4211 may be formed in a plate shape. The first hinge body 4211 may be fixedly connected to the first housing (e.g., the first housing 311 of FIG. 3) or the second housing (e.g., the second housing 312 of FIG. 3). The first hinge body 4211 may be parallel to the front surface (e.g., the surface facing the +Z-axis direction in FIG. 3A) of the first housing 311 or the second housing 312. At least one housing fixing hole 42111 for fixing the hinge member 421 to the first housing 311 or the second housing 312 may be formed in the first hinge body 4211. For example, the housing fixing hole 42111 may penetrate through the first hinge body 4211 in the Z-axis direction. For example, a fastening member (e.g., a screw, a bolt, a pin, and/or a combination fastening structure) may be inserted into the housing fixing hole 42111. Although two housing fixing holes 42111 are illustrated in FIG. 4F, this is only an example, and the number of housing fixing holes 42111 is not limited thereto.

In an embodiment, the second rail structure 4212 may be formed at one edge of the first hinge body 4211. For example, referring to FIG. 4F, the second rail structure 4212 may extend from the edge of the first hinge body 4211 in the +Y-axis direction. The second rail structure 4212 may protrude in an arc shape at a predetermined angle. The second rail structure 4212 may be formed in a shape corresponding to the first rail structure 411a or 411b of the hinge bracket 410. The second rail structure 4212 may be inserted into the first rail structure 411a or 411b and may rotate about the hinge axis Ha or Hb in a designated angle range along the first rail structure 411a or 411b. The second rail structure 4212 may rotate on a Y-Z plane about the hinge axis Ha or Hb defined by the first rail structure 411a or 411b. For example, the hinge structure 420a or 420b may rotate on the Y-Z plane about the hinge axis Ha or Hb defined by the first rail structure 411a or 411b and the second rail structure 4212. The first rail structure 411a or 411b and the second rail structure 4212 may allow only a rotational motion of the hinge structure 420*a* or 420*b* on the Y-Z plane and may restrict a translational movement and/or a rotational motion of the hinge structure 420*a* or 420*b* in another direction. For example, the outer side of the second rail structure 4212 in a radial direction may be stepped to have a relatively wider width (e.g., a width in the X-axis direction) than the inner side of the second rail structure 4212. The outer side of the first rail structure 411*a* or 411*b* in a radial direction may be stepped to have a relatively wider width (e.g., a width in the X-axis direction) than the inner side of the first rail structure 411*a* or 411*b*. In addition, although illustrated and described as the two first rail structures 411*a* and 411*b* recessed and the second rail structure 4212 protruding, this is only an example, and the two first rail structures 411*a* and 411*b* may protrude, and the second rail structure 4212 may be recessed.

In an embodiment, the rotation guide 4213 may extend from the second rail structure 4212 in the direction (e.g., the −X-axis direction and/or the +X-axis direction) of the hinge axis Ha or Hb. At least a portion of a cross-section of the rotation guide 4213 may have an arc shape in the direction from the upper surface (e.g., the surface facing the +Z-axis direction) to the lower surface (e.g., the surface facing the −Z-axis direction). For example, the rotation guide 4213 may protrude in the hinge axis Ha or Hb in an arc shape having the hinge axis Ha or Hb as a center from the inner side of the second rail structure 4212 in the radial direction. The rotation guide 4213 may rotate along the arcuate structure of the hinge bracket 410 while contacting the arcuate structure of the hinge bracket 410 and may guide a rotation path with respect to the hinge axis Ha or Hb of the first hinge member 421.

In an embodiment, the extension body 4214 may extend from a side portion of the first hinge body 4211. For example, referring to FIG. 4F, the extension body 4214 may extend from the edge of the first hinge body 4211 in the +X-axis direction. The extension body 4214 may be formed in a plate shape. For example, referring to FIG. 4F, the extension body 4214 may extend from the edge of the first hinge body 4211 in the +X-axis direction to the −Z-axis direction and may be formed in a plate shape having the Y-Z directional plane. A structure to be connected to the second hinge member 422 to be described below may be formed in the extension body 4214. For example, a pin fixing hole 42141 and the first structure 4215 may be formed in the extension body 4214. The pin fixing hole 42141 may penetrate through the extension body 4214 or may be recessed in the extension body 4214. For example, the pin fixing hole 42141 may penetrate through the extension body 4214 or may be recessed in the extension body 4214 in the +X-axis direction. The first structure 4215 may be formed at an edge (e.g., an edge in the −Y-axis direction) of the extension body 4214. The pin fixing hole 42141 may be between the first structure 4215 and the second rail structure 4212. The detailed description of the pin fixing hole 42141 and the first structure 4215 is provided below.

In an embodiment, the second hinge member 422 may be connected to the first hinge member 421 such that the second hinge member 422 may integrally rotate with the first hinge member 421 about the hinge axis Ha or Hb. The second hinge member 422 may pivot with respect to the first hinge member 421.

In an embodiment, the second hinge member 422 may include a second hinge body 4221, the detent structure 4222, a rotating cam 4223, and a second structure 4224.

In an embodiment, the second hinge body 4221 may be formed in a plate shape. The second hinge body 4221 may be parallel to the extension body 4214 of the first hinge body 4211. For example, referring to FIG. 4G, the second hinge body 4221 may be on the Y-Z plane. A pin through hole 42211 and the second structure 4224 may be formed in the second hinge body 4221. The pin through hole 42211 may penetrate through the second hinge body 4221. For example, the pin through hole 42211 may penetrate through the second hinge body 4221 in the X-axis direction. The pin through hole 42211 may be formed at a position corresponding to that of the pin fixing hole 42141. The second structure 4224 may be formed at an edge (e.g., an edge in the −Y-axis direction) of the second hinge body 4221. The second structure 4224 may be formed at a position corresponding to that of the first structure 4215 to interoperate with the first structure 4215. The first structure 4215 and the second structure 4224 may interoperate with each other and may define a pivot axis Pa or Pb. The detailed description of the pin through hole 42211 and the second structure 4224 is provided below.

In an embodiment, the detent structure 4222 may be opposite to the second structure 4224. The detent structure 4222 may extend to the other edge (e.g., an edge in the +Y-axis direction) of the second hinge body 4221. The detent structure 4222 may be formed in an arc shape at a predetermined angle. The detent structure 4222 may be inserted into the detent groove 412*a* or 412*b* and may rotate in a designated angle range along the detent groove 412*a* or 412*b*. When the second hinge member 422 pivots with respect to the first hinge member 421, the thickness of the detent groove 412*a* or 412*b* in the X-axis direction may be greater than the thickness of the detent structure 4222 in the X-axis direction such that the detent structure 4222 may be tilted in the detent groove 412*a* or 412*b*. The arc shape of the detent structure 4222 may correspond to the rotation guide 4213 of the first hinge member 421. The detent structure 4222 may contact and engage with the rotation guide 4213. When the second hinge member 422 rotates about the hinge axis Ha or Hb, the detent structure 4222 may rotate around the rotation guide 4213, and the rotation path of the second hinge member 422 may be guided.

In an embodiment, the rotating cam 4223 may be formed on one surface of the detent structure 4222. For example, referring to FIG. 4G, the rotating cam 4223 may be formed on a surface facing the −X-axis direction of the detent structure 4222. For example, the rotating cam 4223 may be on the opposite side of the second structure 4224. The rotating cam 4223 may be in a direction facing the fixed cam 413*a* or 413*b*. For example, the rotating cam 4223 of the hinge structure 420*a* may be in the −X-axis direction, and the rotating cam 4223 of the other hinge structure 420*a* may be in the +X-axis direction. The rotating cam 4223 may be along an arc having the hinge axis Ha or Hb as a center. The rotating cam 4223 may include at least one crest and/or trough structure. For example, the rotating cam 4223 may protrude to include a third inclined surface 42231, a second flat surface 42232, and a fourth inclined surface 42233. The rotating cam 4223 may interoperate with the fixed cam 413*a* or 413*b*. For example, the rotating cam 4223 may engage with the fixed cam 413*a* or 413*b*. As illustrated in FIGS. 4A and 4B, when the hinge assembly 400 is in the unfolded state, the rotating cam 4223 and the fixed cam 413*a* or 413*b* may alternately engage with each other. For example, as illustrated in FIGS. 4A and 4B, when the hinge assembly 400 is in the unfolded state, the third inclined surface 42231 of the rotating cam 4223 may contact the first inclined surface 4131 of the fixed cam 413*a* or 413*b*. The rotating cam 4223 may engage and rotate with the fixed cam 413*a* or 413*b* as the detent structure 4222 rotates in the detent groove 412*a* or 412*b*. For example, in the process of the hinge structure 420*a* or 420*b* rotating from the unfolded state to the folded state with respect to the hinge bracket 410, the third inclined surface 42231 of the rotating cam 4223 may contact the first inclined surface 4131 of the fixed cam 413*a* or 413*b* in the unfolded state (e.g., refer to FIG. 4C), the second flat surface 42232 of the rotating cam 4223 may contact the first flat surface 4132 of the fixed cam 413*a* or 413*b* in the intermediate state (e.g., refer to FIG. 4M), and the fourth inclined surface 42233 of the rotating cam 4223 may contact the second inclined surface 4133 of the fixed cam 413*a* or 413*b* in the folded state (e.g., refer to FIG. 4Q). The engagement state of the rotating cam 4223 and the fixed cam 413*a* or 413*b* is described in detail below.

In an embodiment, the pin member 423 may connect the first hinge member 421 to the second hinge member 422. The pin member 423 may be formed in a longitudinal direction. For example, the pin member 423 may have a length in the X-axis direction. The pin member 423 may be inserted to sequentially pass through the pin through hole 42211 of the second hinge member 422 and the pin fixing hole 42141 of the first hinge member 421 in a state in which the pin member 423 is inserted into the elastic member 424. The pin member 423 may be fixedly connected to the pin fixing hole 42141. For example, a screw thread may be formed at an edge (e.g., the edge in the −X-axis direction of the hinge structure 420*a* of FIG. 4A) of the pin member 423, and a screw thread corresponding thereto may be formed at the pin fixing hole 42141. A pin head 4231 may be formed at the other edge (e.g., the edge in the +X-axis direction in FIG. 4A) of the pin member 423. The pin head 4231 may have a greater diameter than that of a pin portion of the pin member 423.

In an embodiment, the elastic member 424 may generate an elastic force. For example, the elastic member 424 may generate an elastic force in the longitudinal direction. The elastic member 424 may be in a direction parallel to the hinge axis Ha or Hb and may generate an elastic force in the longitudinal direction. For example, the center of the elastic member 424 may have an empty spring shape. The pin member 423 may be inserted into the elastic member 424 and may be between the pin head 4231 and the second hinge member 422. The elastic member 424 may generate an elastic force in a direction of pressing the second hinge member 422 from the pin head 4231. For example, in the case of the hinge structure 420*a* of FIG. 4A, the elastic member 424 may press the second hinge member 422 in the −X-axis direction from the pin head 4231. For example, the elastic member 424 may provide an elastic force to the second hinge member 422 in a direction in which the rotating cam 4223 presses the fixed cam 413*a* or 413*b*. In this structure, the rotating cam 4223 and the fixed cam 413*a* or 413*b* may closely contact each other.

In an embodiment, the elastic member 424 may be between the hinge axis Ha or Hb and the pivot axis Pa or Pb. For example, the elastic member 424 may be parallel to the hinge axis Ha or Hb between an edge (e.g., the edge in the −Y-axis direction) of the second hinge member 422 and the other edge (e.g., the edge in the +Y-axis direction) of the second hinge member 422. However, this is only an example, and the elastic member 424 may be outside the pivot axis Pa or Pb with respect to the hinge axis Ha or Hb. For example, the pivot axis Pa or Pb may be between the elastic member 424 and the hinge axis Ha or Hb.

In an embodiment, the first structure 4215 formed at an edge (e.g., the edge in the −Y-axis direction of the hinge structure 420*a* of FIG. 4A) of the first hinge member 421 may interoperate with the second structure 4224 formed at an edge (e.g., the edge in the −Y-axis direction of the hinge structure 420*a* of FIG. 4A) of the second hinge member 422. The first structure 4215 and the second structure 4224 may form the pivot axis Pa or Pb such that the second hinge member 422 may pivot with respect to the first hinge member 421. The pivot axis Pa or Pb may be perpendicular to the hinge axis Ha or Hb. For example, the pivot axis Pa or Pb may be formed in the Z-axis direction. The second hinge member 422 may pivot about the pivot axis Pa or Pb with respect to the first hinge member 421.

Figure 4H:
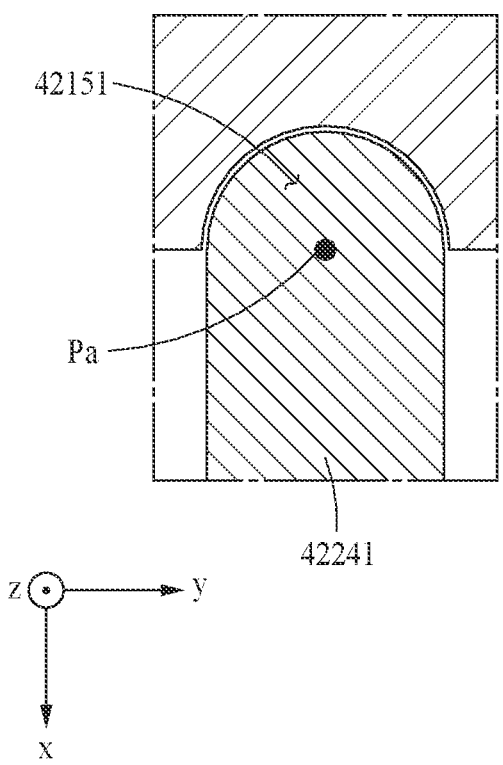
FIGS. 4H and 4I are cross-sectional views each illustrating where a first structure and a second structure engage with each other, according to an embodiment.
Figure 4I:
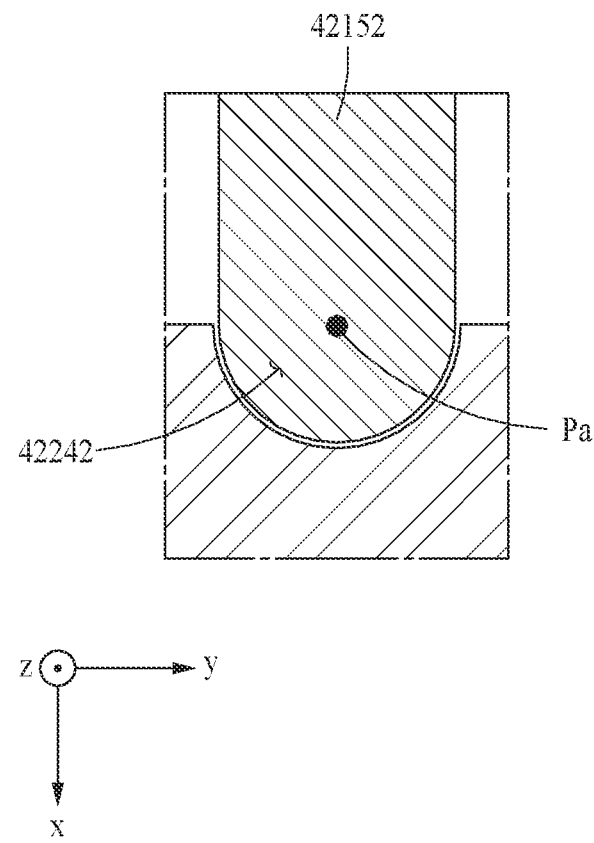
Figure 4J:
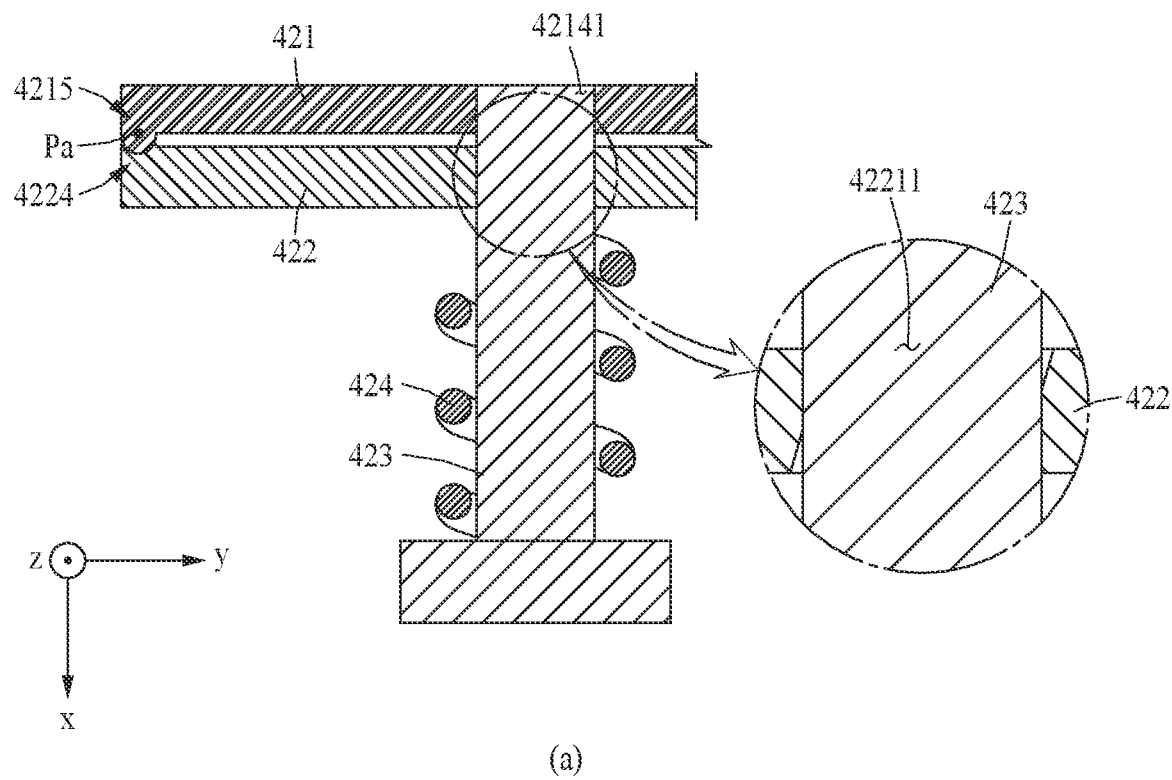
FIG. 4J is a diagram illustrating a pivoting operation of a second hinge member with respect to a first hinge member, according to an embodiment.
Figure 4J:
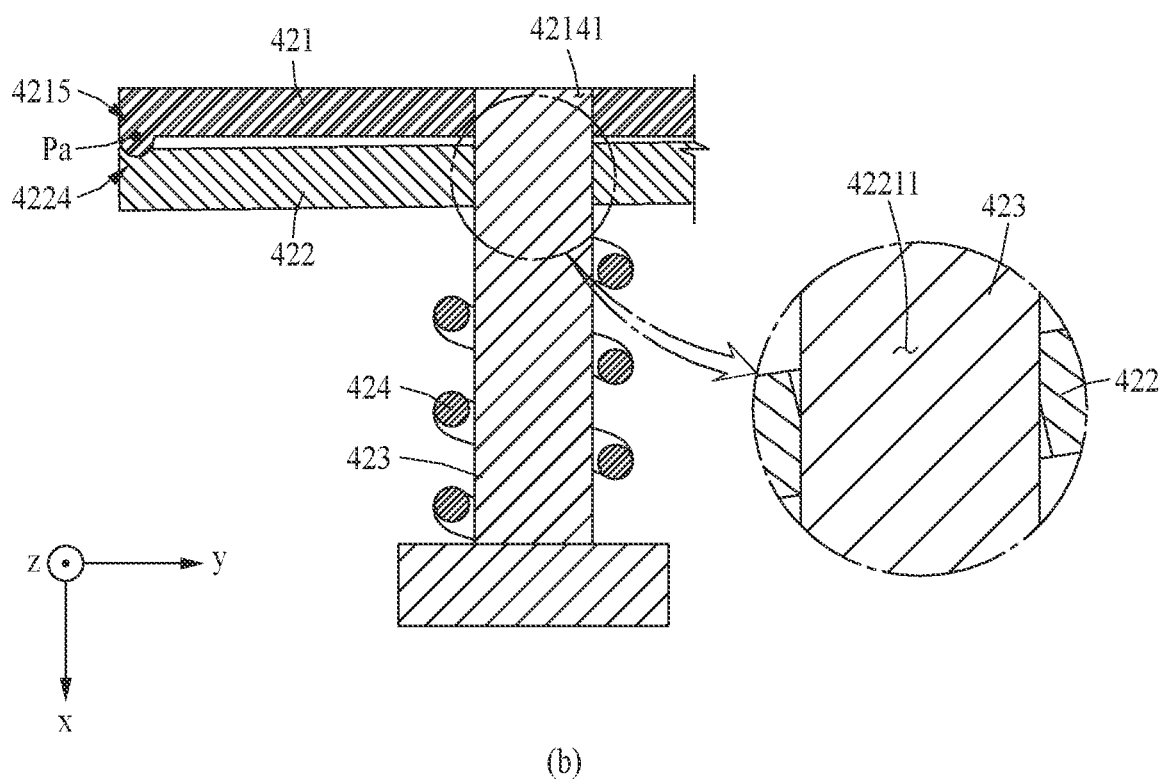

FIGS. 4H and 4I are cross-sectional views each illustrating a state in which a first structure and a second structure engage with each other, according to an embodiment. FIG. 4J is a diagram illustrating a pivoting operation of a second hinge member with respect to a first hinge member, according to an embodiment.

Referring to FIGS. 4A to 4J, the first structure 4215 may include at least one first recess, including recesses 42151, and at least one first protrusion 42152. The first recess 42151 may recess from one surface (e.g., the surface facing the +X-axis direction in FIG. 4F) of the extension body 4214 in an inward direction (e.g., the −X-axis direction in FIG. 4F). The first protrusion 42152 may protrude from one surface (e.g., the surface facing the +X-axis direction in FIG. 4F) of the extension body 4214 in an outward direction (e.g., the +X-axis direction in FIG. 4F). The first recess 42151 may alternate with the first protrusion 42152 along a corner of the extension body 4214. For example, the first recess 42151 may alternate with the first protrusion 42152 in the Z-axis direction. For example, as illustrated in FIG. 4F, the first recesses 42151 may be formed as a pair, and the first protrusion 42152 may be between the pair of first recesses 42151. However, this is only an example, and the number and/or arrangement of the first recess 42151 and the first protrusion 42152 are not limited to the foregoing examples. At least some of a cross-section of the first recess 42151 with respect to the X-Y plane may be formed in an arc shape. At least some of a cross-section of the first protrusion 42152 with respect to the X-Y plane may be formed in an arc shape. The arc shape of the first recess 42151 may correspond to the arc shape of the first protrusion 42152.

In an embodiment, the second structure 4224 may include at least one second protrusion, including protrusions 42241, and at least one second recess 42242. The second recess 42242 may be recessed from one surface (e.g., the surface facing the −X-axis direction in FIG. 4G) of the second hinge body 4221 in an inward direction (e.g., the +X-axis direction in FIG. 4G). The second protrusions 42241 may protrude from one surface (e.g., the surface facing the −X-axis direction in FIG. 4G) of the second hinge body 4221 in an outward direction (e.g., the −X-axis direction in FIG. 4G). The second recess 42242 may alternate with the second protrusions 42241 along a corner of the second hinge body 4221. For example, the second recess 42242 may alternate with the second protrusions 42241 in the Z-axis direction. For example, as illustrated in FIG. 4G, the second protrusions 42241 may be formed as a pair, and the second recess 42242 may be between the pair of second protrusions 42241. However, this is only an example, and the number and/or arrangement of the second recess 42242 and the second protrusions 42241 are not limited to the foregoing examples. At least some of a cross-section of the second recess 42242 with respect to the X-Y plane may be formed in an arc shape. The arc shape of the second recess 42242 may correspond to the arc shape of the first protrusion 42152. At least some of a cross-section of the second protrusions 42241 with respect to the X-Y plane may be formed in an arc shape. The arc shape of the second protrusions 42241 may correspond to the arc shape of the first recesses 42151.

In an embodiment, the second protrusions 42241 may engage with the first recesses 42151, and the first protrusion 42152 may engage with the second recess 42242. For example, a protruding portion of the second protrusions 42241 may be inserted into a recessed portion of the first recesses 42151, and a protruding portion of the first protrusion 42152 may be inserted into a recessed portion of the second recess 42242. In this insertion structure, the relative movement of the second hinge member 422 in the Y-axis direction with respect to the first hinge member 421 may be limited. In addition, as a structure in which the second protrusions 42241 engage with the first recesses 42151 alternating, in the Z-axis direction, with a structure in which the first protrusions 42152 engage with the second recess 42242, the relative movement of the second hinge member 422 in the Z-axis direction with respect to the first hinge member 421 may be limited, and the relative rotation of the second hinge member 422 about the pin member 423 with respect to the first hinge member 421 may also be limited.

In an embodiment, the second protrusion 42241 may rotate with respect to the first recess 42151 in a contact state along an engaged arc shape. Likewise, the first protrusion 42152 may rotate with respect to the second recess 42242 in a contact state along an engaged arc shape. The engaged arc shape of the second protrusion 42241 and the first recess 42151 and the engaged arc shape of the first protrusion 42152 and the second recess 42242 may define the pivot axis Pa or Pb. The pivot axis Pa or Pb may be perpendicular to the hinge axis Ha or Hb. For example, the pivot axis Pa or Pb may be formed in the Z-axis direction. In this structure, the second hinge member 422 may pivot about the pivot axis Pa or Pb with respect to the first hinge member 421. The upper part of FIG. 4J illustrates a state in which the second hinge member 422 is parallel to the first hinge member 421. The lower part of FIG. 4J illustrates a state in which the second hinge member 422 pivots about the pivot axis Pa or Pb with respect to the first hinge member 421. For example, as illustrated in the lower part of FIG. 4J, the second hinge member 422 may pivot with respect to the first hinge member 421 such that the edges thereof may be closer to each other. To prevent the pin member 423 from interfering with the pin through hole 42211 while the second hinge member 422 pivots with respect to the first hinge member 421, at least a portion of the pin through hole 42211 may be penetrated at an incline. For example, as illustrated in FIG. 4J, at least a portion of the pin through hole 42211 may be penetrated in the -X-axis direction, and at least another portion of the pin through hole 42211 may be penetrated in a direction between the -X-axis direction and the +Y-axis direction. In this structure, although the second hinge member 422 pivots with respect to the first hinge member 421 in a direction in which the edges thereof are closer to each other, the pin member 423 inserted into the pin through hole 42211 may not interfere with an inner wall of the pin through hole 42211. However, this is only an example, and the second hinge member 422 may pivot with respect to the first hinge member 421 in a direction in which the edges thereof are away from each other, and in this case, at least a portion of the pin through hole 42211 may be penetrated in a direction between the -X-axis direction and the -Y-axis direction. In addition, it should be noted that the inclined structure of the pin through hole 42211 illustrated in FIG. 4J is exaggerated for convenience of description.

Figure 4K:
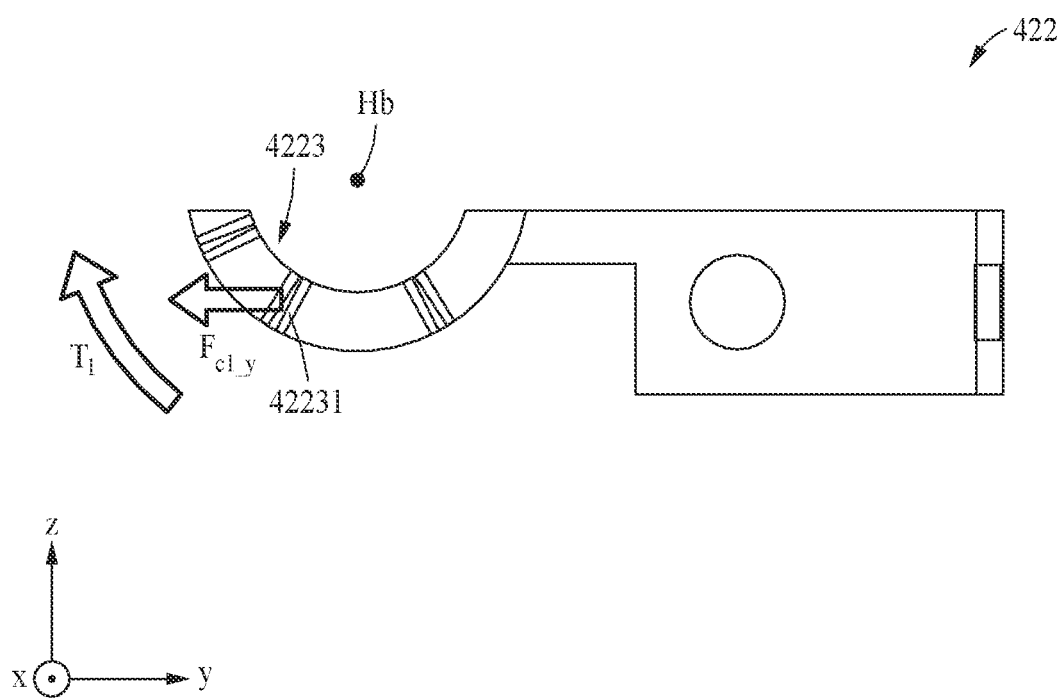
FIG. 4K is a diagram illustrating a force and torque acting on a second hinge member of a hinge structure of FIGS. 4A to 4C.

FIG. 4K is a diagram illustrating a force and torque acting on a second hinge member of a hinge structure of FIGS. 4A to 4C.

Hereinafter, the force and torque acting on the hinge structure 420b in the unfolded state of the hinge assembly 400 according to an embodiment are described with reference to FIGS. 4A to 4C and 4K. However, this is for convenience of description, and the other hinge structure 420a may also operate in a manner corresponding to that of the hinge structure 420b. The unfolded state of the hinge assembly 400 may refer to a state in which the two hinge structures 420a and 420b are fully unfolded with respect to the hinge bracket 410.

In an embodiment, in the unfolded state of the hinge assembly 400, the rotating cam 4223 and the fixed cam 413b may alternately engage with each other. For example, a crest of the fixed cam 413b may be inserted into a trough of the rotating cam 4223. For example, the third inclined surface 42231 of the rotating cam 4223 may contact the first inclined surface 4131 of the fixed cam 413b. The elastic member 424 may provide an elastic force Fs1 to the second hinge member 422 in a direction in which the rotating cam 4223 presses the fixed cam 413b. For example, the elastic member 424 may provide the elastic force Fs1 in the +X-axis direction. As the elastic member 424 applies the elastic force Fs1 in the +X-axis direction in a state in which the crest of the fixed cam 413b is inserted into the trough of the rotating cam 4223, the second hinge member 422 may pivot about the second pivot axis Pb with respect to the first hinge member 421 at a predetermined angle in a direction closer to each other. For example, the second hinge member 422 may pivot about a virtual line in the Y-axis direction with respect to the first hinge member 421 in a direction in which edges thereof in the -Y-axis direction are closer to each other.

In an embodiment, the elastic force Fs1 of the elastic member 424 may press the rotating cam 4223 to the fixed cam 413b in the +X-axis direction. The rotating cam 4223 and the fixed cam 413b may apply a reaction force to each other in a direction perpendicular to inclined surfaces (e.g., the third inclined surface 42231 and the first inclined surface 4131) that are contacting each other. For example, the fixed cam 413b may apply a reaction force Fc1 to the rotating cam 4223 in a direction perpendicular to the third inclined surface 42231 and the first inclined surface 4131. For example, the fixed cam 413b may apply the reaction force Fc1 to the rotating cam 4223 in a direction between the -X-axis direction and the -Y-axis direction. FIG. 4K illustrates a Y-axis direction component Fc1_y of the reaction force Fc1 applied to the third inclined surface 42231 of the rotating cam 4223. Referring to FIG. 4K, the Y-axis direction component Fc1_y of the reaction force Fc1 may generate clockwise torque T1 having the hinge axis Hb as a center. The clockwise torque T1 may be torque in a direction in which the second hinge member 422 is further unfolded with respect to the hinge bracket 410. In this structure, in the unfolded state of the hinge structure 420b, the elastic force Fs1 of the elastic member 424 may act as torque to further unfold the hinge structure 420b. For example, in the unfolded state of the hinge structure 420b, the elastic force Fs1 of the elastic member 424 may act as a kind of open detent for maintaining the hinge structure 420b in the unfolded state. Accordingly, the hinge structure 420b may start to be folded with respect to the hinge bracket 410 only when a greater force than the open detent is applied, and the hinge structure 420b may be maintained in the unfolded state with respect to the hinge bracket 410 when a greater force than the open detent is not applied.

Figure 4L:
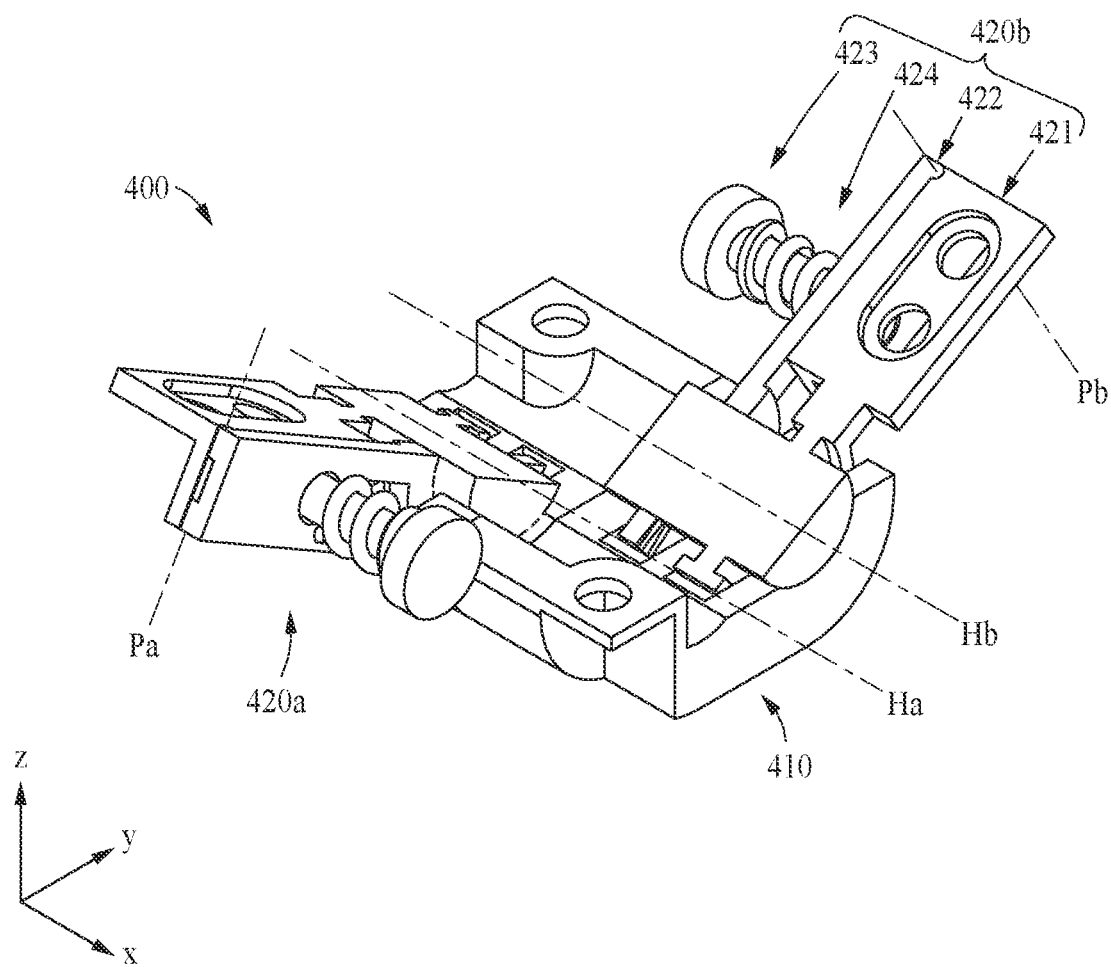
FIG. 4L is a perspective view illustrating an intermediate state of the hinge assembly according to an embodiment.
Figure 4M:
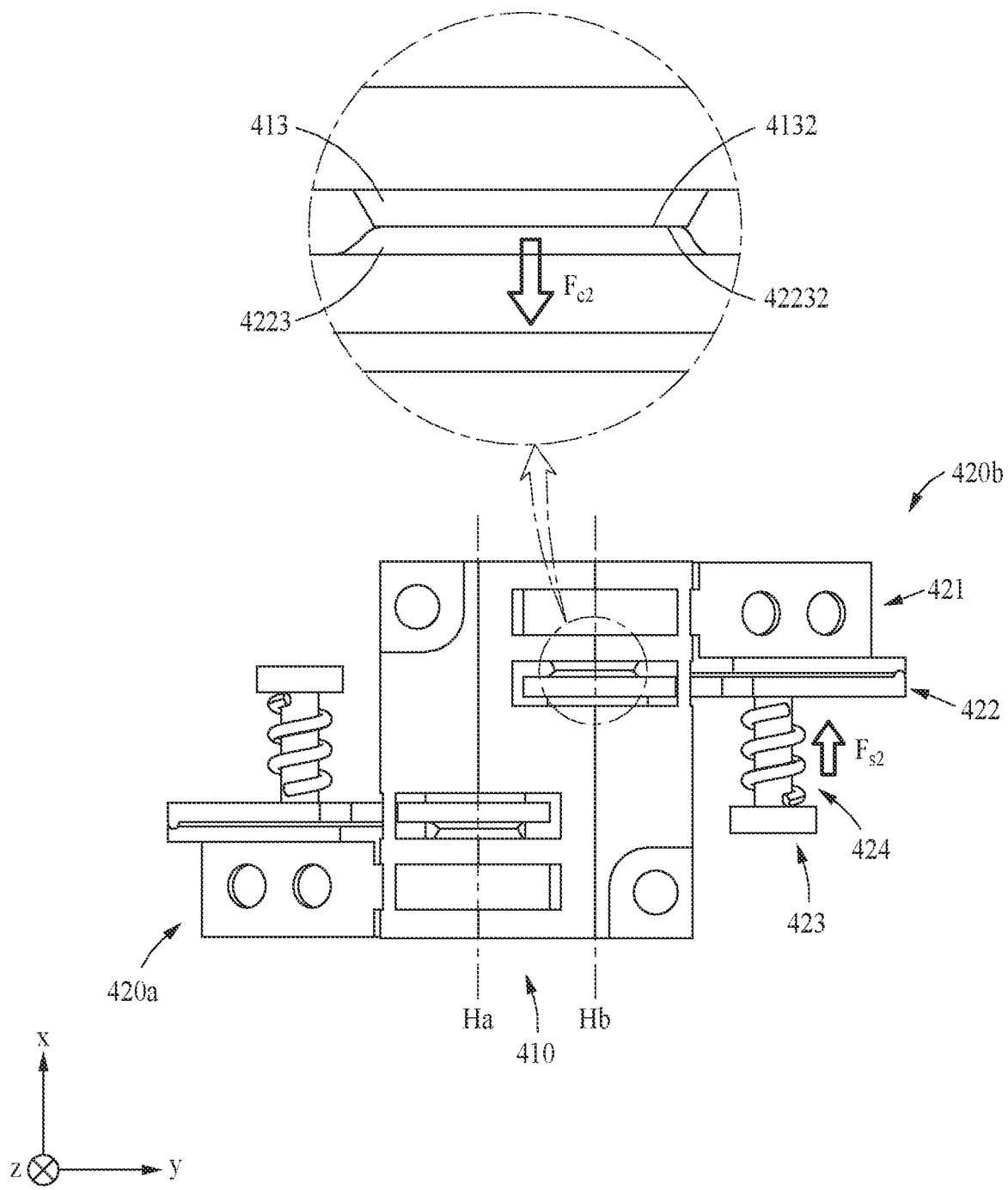
FIG. 4M is a rear view illustrating an intermediate state of the hinge assembly according to an embodiment.
Figure 4N:
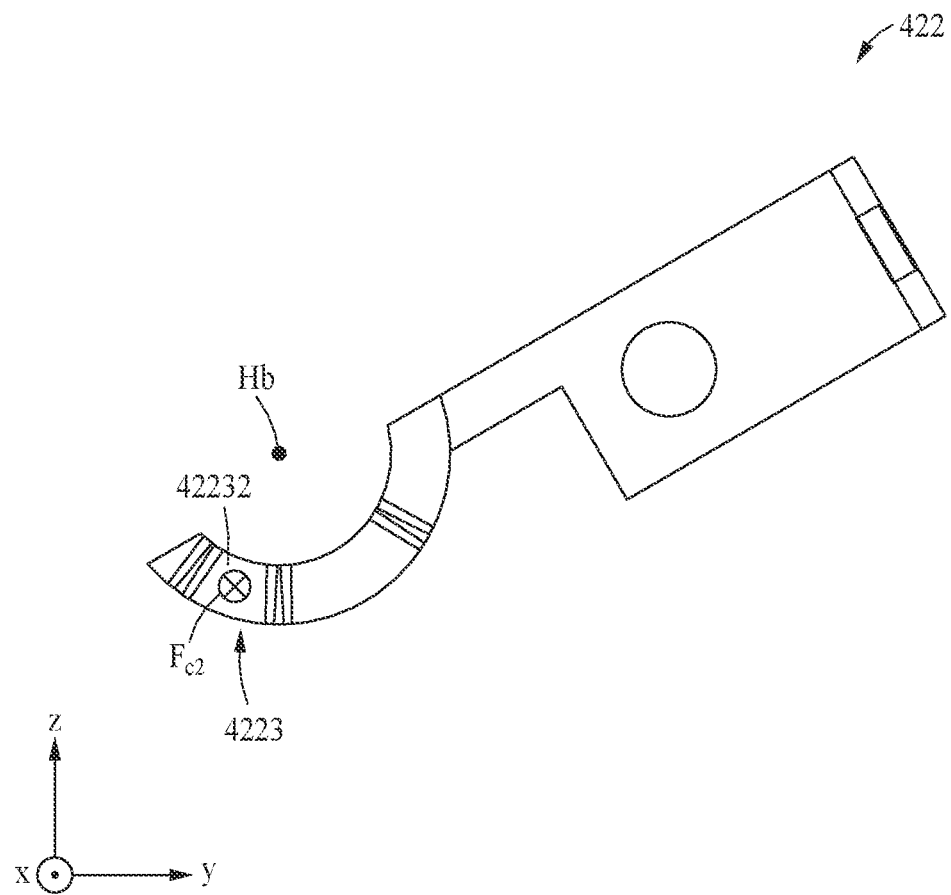
FIG. 4N is a diagram illustrating a force and torque acting on a second hinge member of a hinge structure of FIGS. 4L and 4M.

FIG. 4L is a perspective view illustrating an intermediate state of the hinge assembly according to an embodiment. FIG. 4M is a rear view illustrating an intermediate state of the hinge assembly according to an embodiment. FIG. 4N is a diagram illustrating a force and torque acting on a second hinge member of a hinge structure of FIGS. 4L and 4M.

Hereinafter, a force acting on the hinge structure 420*b* in an intermediate state of the hinge assembly 400 is described with reference to FIGS. 4L to 4N. However, this is for convenience of description, and the other hinge structure 420*a* may also operate in a manner corresponding to that of the hinge structure 420*b*. The intermediate state of the hinge assembly 400, which is a state between the unfolded state and the folded state, may refer to a state in which the two hinge structures 420*a* and 420*b* rotates in a designated angle range about the hinge axes Ha and Hb with respect to the hinge bracket 410.

In an embodiment, in the intermediate state of the hinge assembly 400, the rotating cam 4223 and the fixed cam 413*b* may engage with each other. For example, the crest of the fixed cam 413*b* and the crest of the rotating cam 4223 may engage with each other. For example, the second flat surface 42232 of the rotating cam 4223 may contact the first flat surface 4132 of the fixed cam 413*b*. The elastic member 424 may provide an elastic force Fs2 to the second hinge member 422 in a direction in which the rotating cam 4223 presses the fixed cam 413*b*. For example, the elastic member 424 may provide the elastic force Fs2 in the +X-axis direction. In a process where the hinge structure 420*b* rotates with respect to the hinge bracket 410 from the unfolded state to the intermediate state, the rotating cam 4223 and the fixed cam 413*b* having alternately arranged with each other may contact face to face with their flat surfaces, and accordingly, the second hinge member 422 may pivot about the second pivot axis Pb with respect to the first hinge member 421 in a direction away from each other. For example, the second hinge member 422 may be parallel to the first hinge member 421 about a virtual line in the Y-axis direction.

In an embodiment, the elastic force Fs2 of the elastic member 424 may press the rotating cam 4223 to the fixed cam 413*b* in the +X-axis direction. The rotating cam 4223 and the fixed cam 413*b* may apply a reaction force to each other in a direction perpendicular to flat surfaces (e.g., the second flat surface 42232 and the first flat surface 4132) that are in contact with each other. For example, the fixed cam 413*b* may apply a reaction force Fc2 to the rotating cam 4223 in a direction perpendicular to the second flat surface 42232 and the first flat surface 4132. For example, the fixed cam 413*b* may apply the reaction force Fc2 to the rotating cam 4223 in the −X-axis direction. FIG. 4N illustrates the reaction force Fc2 applied to the second flat surface 42232 of the rotating cam 4223. Referring to FIG. 4N, since the reaction force Fc2 does not have a Y-axis direction or Z-axis direction component, the reaction force Fc2 may not generate any torque having the hinge axis Hb as a center. Instead, the reaction force Fc2 may act as a normal force that generates a friction force between the second flat surface 42232 and the first flat surface 4132. Accordingly, a great friction force may be generated between the second flat surface 42232 and the first flat surface 4132 due to the reaction force Fc2 acting perpendicularly to the second flat surface 42232 and the first flat surface 4132. In this structure, in the intermediate state of the hinge structure 420*b*, the elastic force Fs2 of the elastic member 424 may generate a friction force to prevent the hinge structure 420*b* from being unfolded or folded. For example, in the intermediate state of the hinge structure 420*b*, the elastic force Fs2 of the elastic member 424 may act as a kind of free-stop detent for maintaining the hinge structure 420*b* in the intermediate state. Accordingly, the hinge structure 420*b* may start to be folded or unfolded with respect to the hinge bracket 410 only when a greater force than the free-stop detent is applied, and the hinge structure 420*b* may be maintained in the intermediate state with respect to the hinge bracket 410 when a greater force than the open detent is not applied.

Figure 4O:
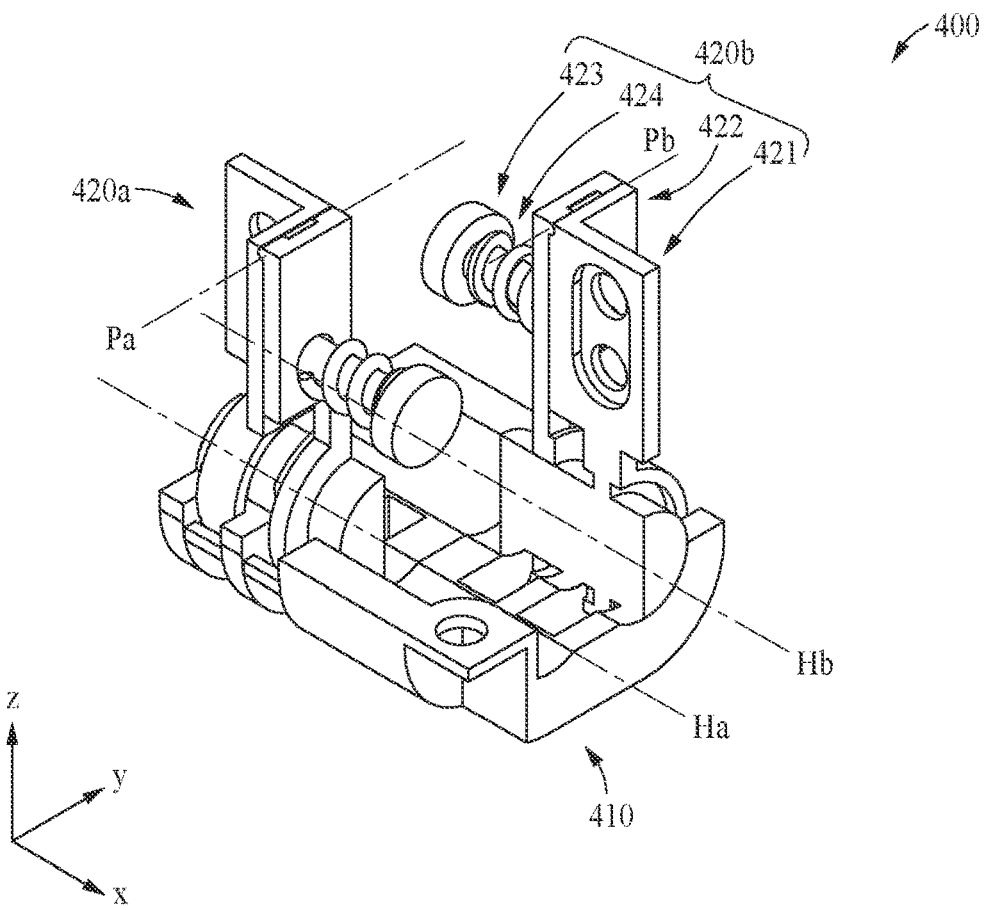
FIG. 4O is a perspective view illustrating a folded state of the hinge assembly according to an embodiment.
Figure 4P:
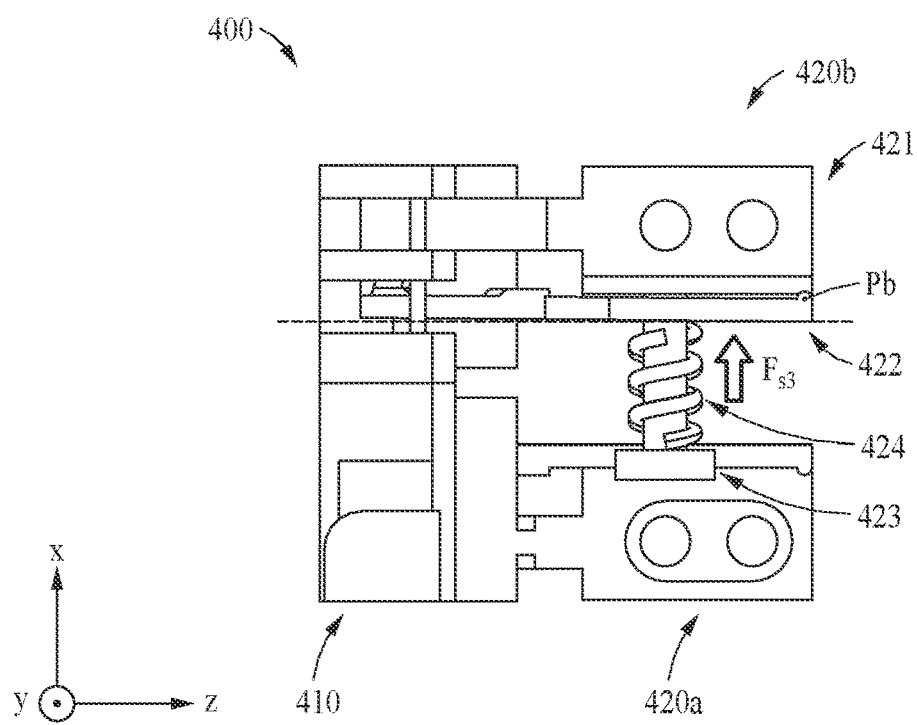
FIG. 4P is a side view illustrating a folded state of the hinge assembly according to an embodiment.
Figure 4Q:
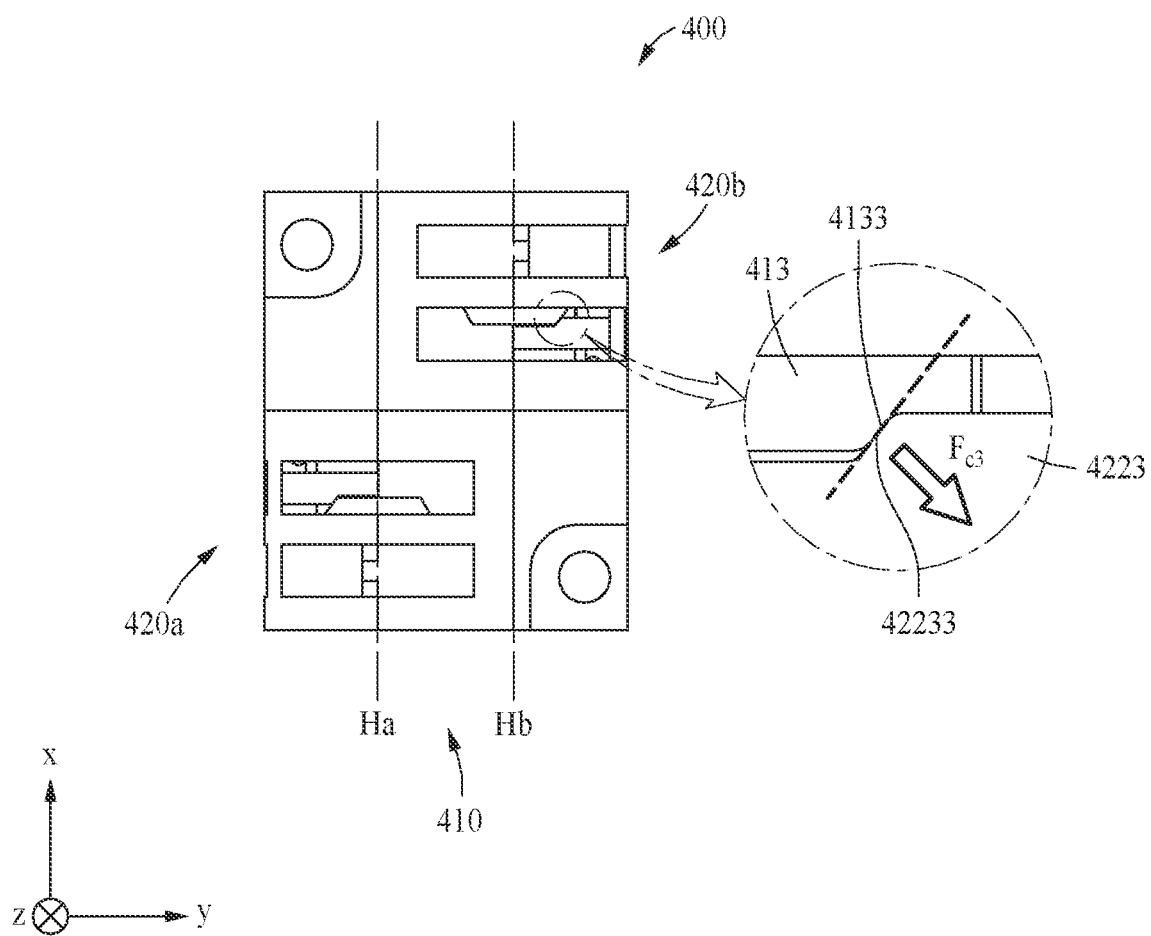
FIG. 4Q is a rear view illustrating a folded state of the hinge assembly according to an embodiment.
Figure 4R:
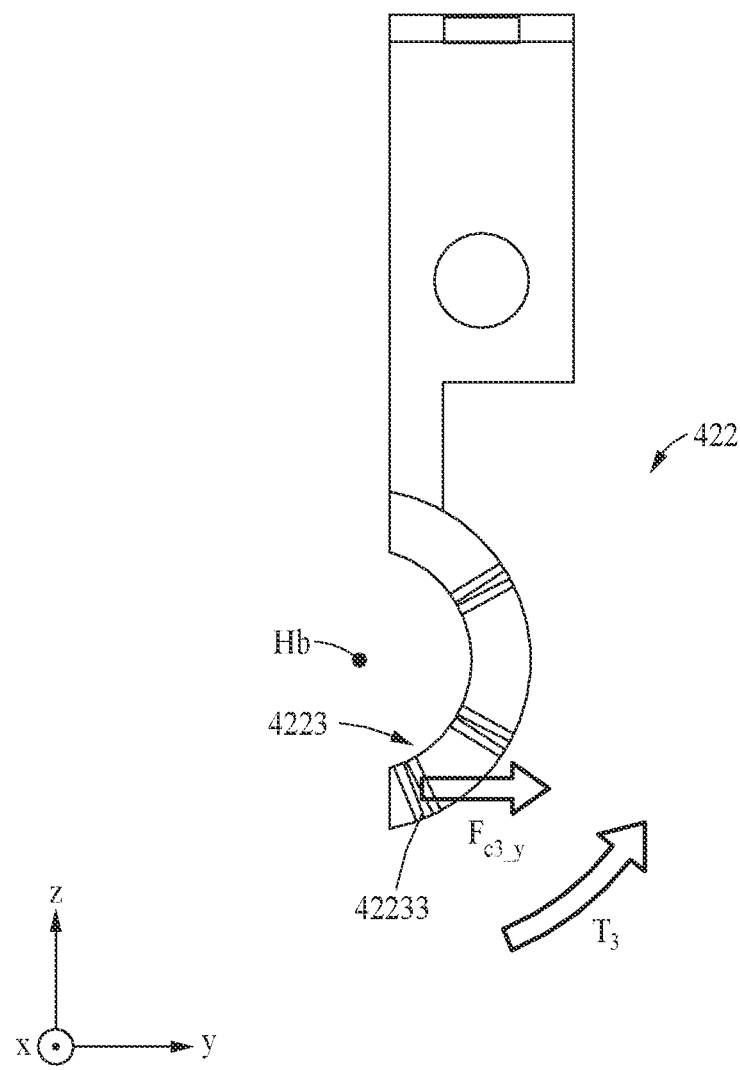
FIG. 4R is a diagram illustrating a force and torque acting on a second hinge member of a hinge structure of FIGS. 4O to 4Q.

FIG. 4O is a perspective view illustrating a folded state of the hinge assembly according to an embodiment. FIG. 4P is a side view illustrating a folded state of the hinge assembly according to an embodiment. FIG. 4Q is a rear view illustrating a folded state of the hinge assembly according to an embodiment. FIG. 4R is a diagram illustrating a force and torque acting on a second hinge member of a hinge structure of FIGS. 4O to 4Q.

Hereinafter, a force and torque acting on the hinge structure 420*b* in the folded state of the hinge assembly 400 according to an embodiment are described with reference to FIGS. 4O to 4R. However, this is for convenience of description, and the other hinge structure 420*a* may also operate in a manner corresponding to that of the hinge structure 420*b*. The folded state of the hinge assembly 400 may refer to a state in which the two hinge structures 420*a* and 420*b* are fully folded with respect to the hinge bracket 410.

In an embodiment, in the state in which the hinge assembly 400 is folded, the rotating cam 4223 and the fixed cam 413*b* may alternately engage with each other. For example, a crest of the fixed cam 413*b* may be inserted into a trough of the rotating cam 4223. For example, the fourth inclined surface 42233 of the rotating cam 4223 may contact the second inclined surface 4133 of the fixed cam 413*b*. The elastic member 424 may provide an elastic force Fs3 to the second hinge member 422 in a direction in which the rotating cam 4223 presses the fixed cam 413*b*. For example, the elastic member 424 may provide the elastic force Fs3 in the +X-axis direction. In a process where the hinge structure 420*b* rotates with respect to the hinge bracket 410 from the intermediate state to the folded state, the rotating cam 4223 and the fixed cam 413*b* having been in contact with their flat surfaces may be alternately arranged with each other, and when the elastic member 424 applies the elastic force Fs3 in the +X-axis direction, the second hinge member 422 may pivot about a second pivot axis (e.g., the second pivot axis Pb of FIG. 4C) with respect to the first hinge member 421 at a predetermined angle in a direction closer to each other. For example, the second hinge member 422 may pivot about a virtual line in the Y-axis direction with respect to the first hinge member 421 in a direction in which edges thereof in the −Y-axis direction are closer to each other.

In an embodiment, the elastic force Fs3 of the elastic member 424 may press the rotating cam 4223 to the fixed cam 413*b* in the +X-axis direction. The rotating cam 4223 and the fixed cam 413*b* may apply a reaction force to each other in a direction perpendicular to inclined surfaces (e.g., the fourth inclined surface 42233 and the second inclined surface 4133) that are in contact with each other. For example, the fixed cam 413*b* may apply a reaction force Fc3 to the rotating cam 4223 in a direction perpendicular to the fourth inclined surface 42233 and the second inclined surface 4133. For example, the fixed cam 413*b* may apply the reaction force Fc3 to the rotating cam 4223 in a direction between the −X-axis direction and the +X-axis direction. FIG. 4R illustrates a Y-axis direction component Fc3_$y$ of the reaction force Fc3 applied to the fourth inclined surface 42233 of the rotating cam 4223. Referring to FIG. 4R, the Y-axis direction component Fc3_y of the reaction force Fc3 may generate counterclockwise torque T3 having the hinge axis Hb as a center. The counterclockwise torque T1 may be torque in a direction in which the second hinge member 422 is further folded with respect to the hinge bracket 410. In this structure, in the folded state of the hinge structure 420*b*, the elastic force Fs3 of the elastic member 424 may act as torque to further fold the hinge structure 420*b*. For example, in the folded state of the hinge structure 420*b*, the elastic force Fs3 of the elastic member 424 may act as a kind of close detent for maintaining the hinge structure 420*b* in the folded state. Accordingly, the hinge structure 420*b* may start to be unfolded with respect to the hinge bracket 410 only when a greater force than the close detent is applied, and the hinge structure 420*b* may be maintained in the folded state with respect to the hinge bracket 410 when a greater force than the close detent is not applied.

In an embodiment, as described with reference to FIGS. 4A to 4R, by arranging the elastic member 424 outside the hinge axis Ha or Hb and configuring the second hinge member 422 pivotable about the pivot axis Pa or Pb with respect to the first hinge member 421, even when there is a gap between components, the first hinge member 421 and the second hinge member 422 may be prevented from interfering with each other. Accordingly, even when there is a gap between components, a sufficient elastic force may be relayed to the rotating cam 4223, and a folding or unfolding operation of the hinge assembly 400 may be smoothly implemented. In addition, by arranging the elastic member 424 outside the hinge axis Ha or Hb, the thickness of the hinge assembly 400 and the number of components thereof may decrease, but a sufficient elastic force of the elastic member 424 may still be secured.

Figure 5A:
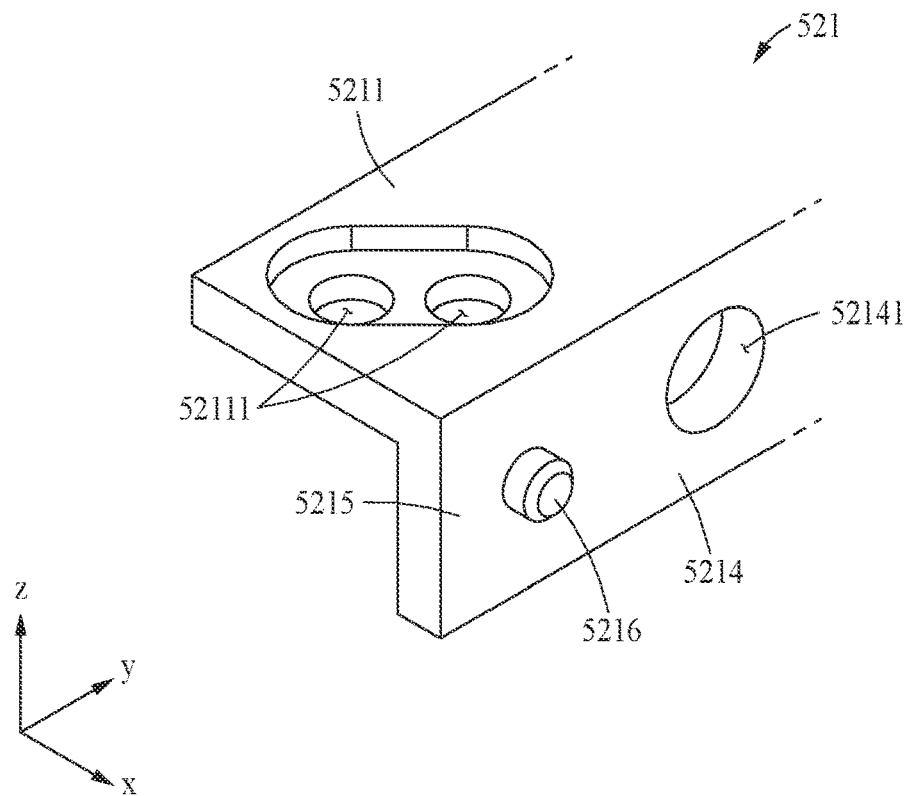
FIG. 5A is a partial perspective view illustrating a first hinge member according to an embodiment.
Figure 5B:
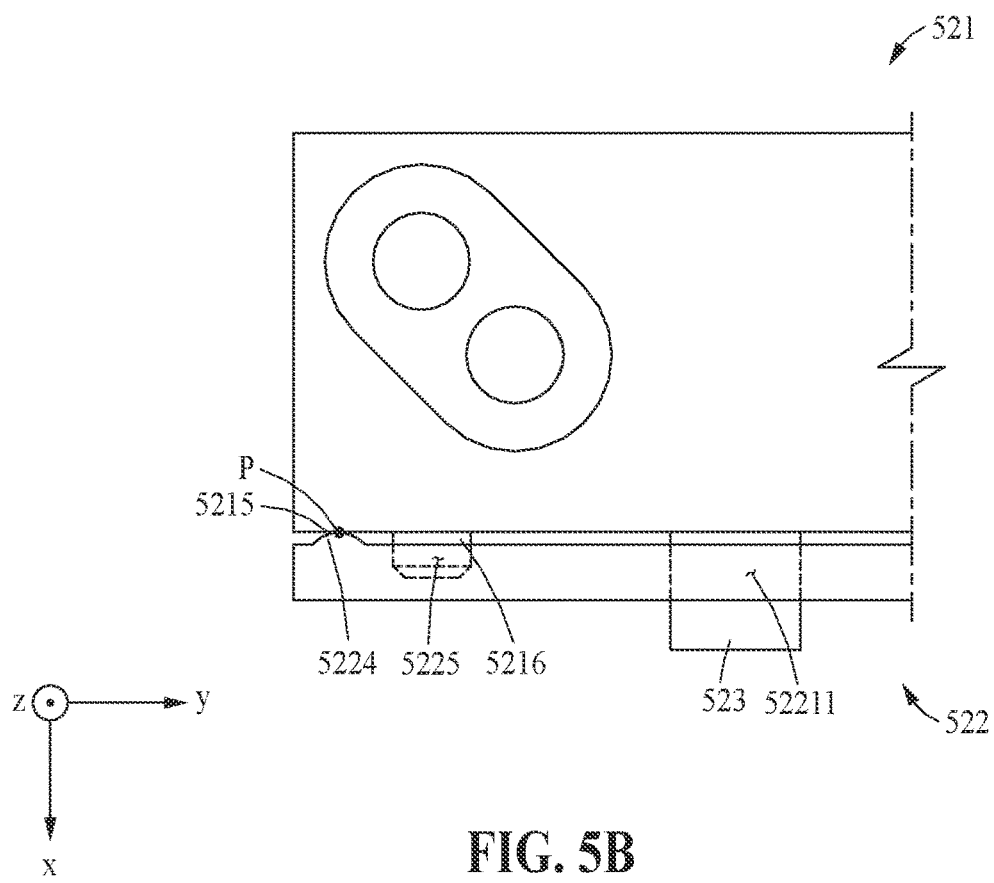
FIG. 5B is a partial front view illustrating a coupled state of the first hinge member and a second hinge member according to an embodiment.

FIG. 5A is a partial perspective view illustrating a first hinge member according to an embodiment. FIG. 5B is a partial front view illustrating a coupled state of the first hinge member and a second hinge member according to an embodiment.

Referring to FIGS. 5A and 5B, a first hinge member 521 according to an embodiment may include a protruding pin 5216 protruding from an extension body 5214. The protruding pin 5216 may protrude from a surface (e.g., a surface facing the +X-axis direction) facing a second hinge member 522 of the extension body 5214 in a direction (e.g., the +X-axis direction) to the second hinge member 522. The protruding pin 5216 may be between a first structure 5215 and a pin fixing hole 52141. For example, the protruding pin 5216 may be adjacent to the first structure 5215.

In an embodiment, the second hinge member 522 may include an insertion hole 5225 into which the protruding pin 5216 of the first hinge member 521 is inserted. The insertion hole 5225 may be recessed from or penetrate through a surface (e.g., a surface facing the −X-axis direction) facing the first hinge member 521 of a second hinge body 5221. In a state in which the pin member 523 couples the first hinge member 521 with the second hinge member 522, the protruding pin 5216 may be inserted into the insertion hole 5225. As such, in the structure in which the protruding pin 5216 is inserted into the insertion hole 5225, the relative movement of the second hinge member 522 with respect to the first hinge member 521 in the X-axis or Y-axis direction may be prevented, and the relative rotation of the second hinge member 522 about the pin member 523 with respect to the first hinge member 521 may also be prevented.

In an embodiment, the first structure 5215 may be flat, and a second structure 5224 may protrude to have an arcuate cross-section. The second structure 5224 may contact the first structure 5215. The second structure 5224 may rotate with respect to the first structure 5215 in a contact state, and a pivot axis P may be at a contact point thereof. The second hinge member 522 may pivot about the pivot axis P with respect to the first hinge member 521.

Figure 6A:
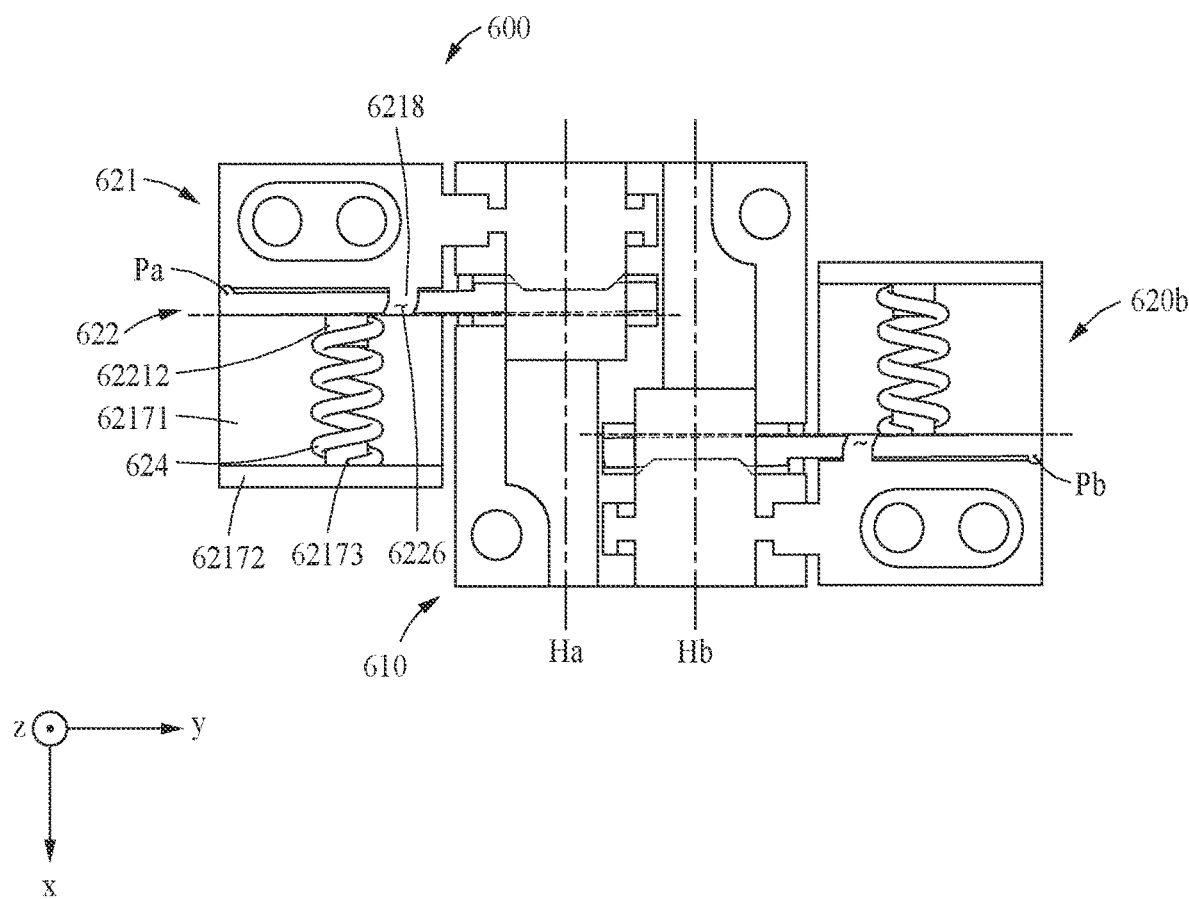
FIG. 6A is a front view illustrating a hinge assembly according to an embodiment.
Figure 6B:
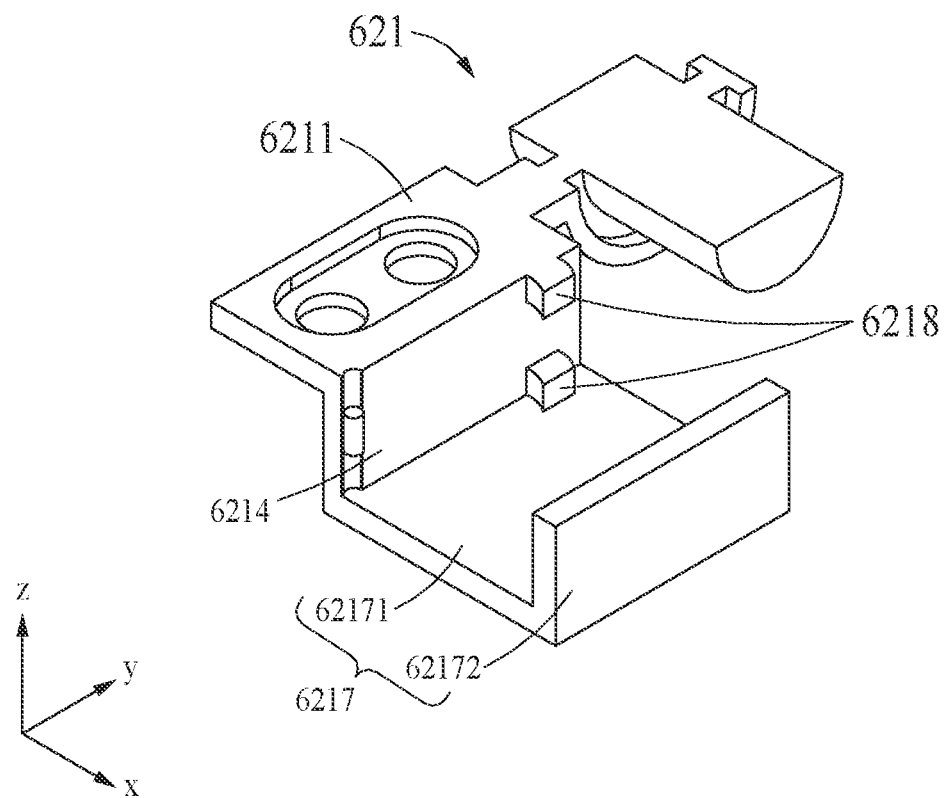
FIG. 6B is a perspective view of a first hinge member according to an embodiment.
Figure 6C:
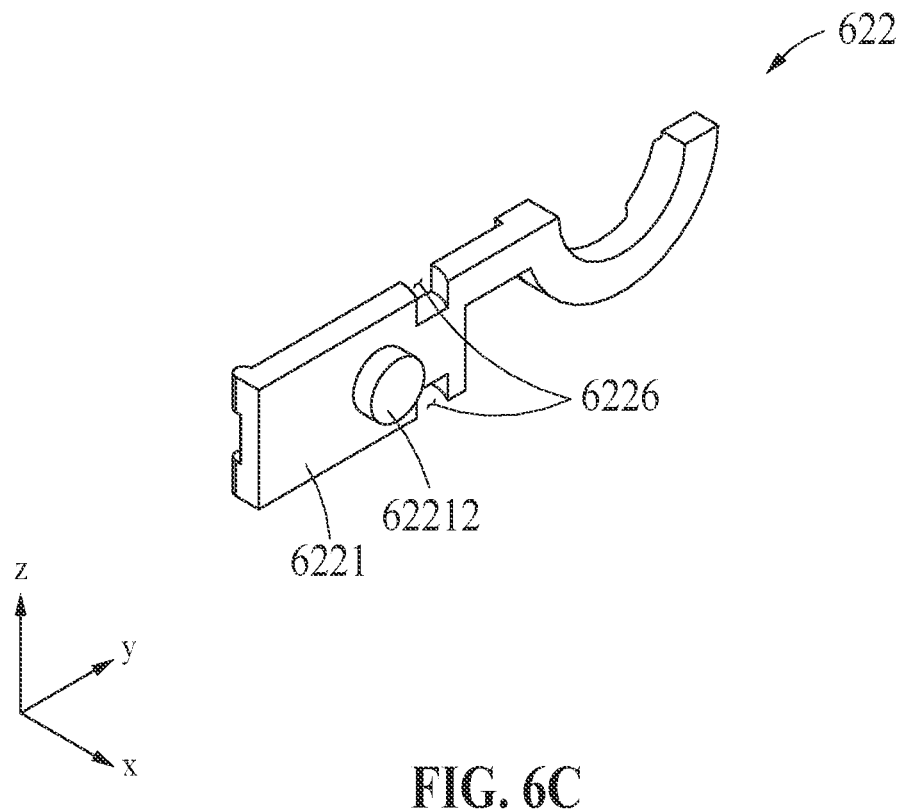
FIG. 6C is a perspective view of a second hinge member according to an embodiment.

FIG. 6A is a front view illustrating a hinge assembly according to an embodiment. FIG. 6B is a perspective view of a first hinge member according to an embodiment. FIG. 6C is a perspective view of a second hinge member according to an embodiment.

Referring to FIGS. 6A to 6C, a first hinge member 621 according to an embodiment may include a support structure 6217 for supporting an elastic member 623. The support structure 6217 may extend to form a space for supporting the elastic member 623 in an extension body 6214. For example, the support structure 6217 may include a first support structure 62171 and a second support structure 62172, in which the first support structure 62171 may extend by a designated length from an edge (e.g., an edge in a −Z-axis direction) of the extension body 6214 in a direction (e.g., a +X-axis direction) perpendicular to the extension body 6214, and the second support structure 62172 may extend by a designated length from an edge of the first support structure 62171 in a direction (e.g., a +Z-axis direction) perpendicular to the first support structure 62171. The second support structure 62172 may be substantially parallel to the extension body 6214. The elastic member 623 may be in a space between the extension body 6214 and the second support structure 62172. Specifically, in a state in which a second hinge member 622 is connected to the first hinge member 621, the elastic member 623 may be between a surface (e.g., a surface facing the +X-axis direction) of the second hinge member 622 and a surface (e.g., a surface facing a −X-axis direction) of the second support structure 62172. To fix the relative position of the elastic member 623 between the second hinge member 622 and the second support structure 62172, a first support protrusion 62212 may be formed in a second hinge body 6221, and a second support protrusion 62173 may be formed in the second support structure 62172, in which the first support protrusion 62212 may protrude from a surface (e.g., a surface facing the +X-axis direction) facing the second support structure 62172 in a direction (e.g., the +X-axis direction) to the second support structure 62172, and the second support protrusion 62173 may protrude from a surface (e.g., a surface facing the −X-axis direction) facing the second hinge body 6221 in a direction (e.g., the −X-axis direction) to the second hinge body 6221. With an edge (e.g., an edge in the −X-axis direction) of the elastic member 623 being inserted into the first support protrusion 62142 and the other edge (e.g., an edge in the +X-axis direction) thereof being inserted into the second support protrusion 62173, the position may be fixed. In this structure, without a separate pin member (e.g., the pin member 423 of FIG. 4A), the elastic member 623 may be supported by the first hinge member 621.

In an embodiment, the first hinge member 621 may include a protrusion guide 6218 for guiding a pivot path of the second hinge member 622. The second hinge member 622 may include a guide hole 6226 into which the protrusion guide 6218 is inserted. The protrusion guide 6218 may protrude, in an arc shape, from a surface (e.g., a surface facing the +X-axis direction), in the extension body 6214, facing the second hinge member 622 in a direction to the second hinge member 622. For example, the protrusion guides 6218 may be respectively at both side edges (e.g., edges in the +Z and −Z axis directions) of the extension body 6214. The arc shape of the protrusion guide 6218 may be an arc shape having a pivot axis Pa or Pb as a center. The guide hole 6226 may penetrate in an arc shape through the second hinge body 6221. The guide hole 6226 may be at a position corresponding to that of the protrusion guide 6218. For example, the guide holes 6226 may be respectively at both side edges (e.g., edges in the +Z and −Z axis directions) of the second hinge body 6221. The arc shape of the guide hole 6226 may be an arc shape having a pivot axis Pa or Pb as a center. The arc shape of the guide hole 6226 may correspond to the arc shape of the protrusion guide 6218. In a state in which the protrusion guide 6218 is inserted into the guide hole 6226, when the second hinge member 622 pivots about the pivot axis Pa or Pb with respect to the first hinge member 621, the protrusion guide 6218 may move along the arc shape of the guide hole 6226 and may guide the pivot path of the second hinge member 622.

In an embodiment, an electronic device 300 includes a display 250 including a first area 251, a second area 252, and a folding area 253 between the first area 251 and the second area 252, a first housing 311 configured to support the first area 251, a second housing 312 configured to support the second area 252, and a hinge assembly 400 configured to connect the first housing 311 to the second housing 312 and operate between a folded state and an unfolded state, in which the first area 251 and the second area 252 face each other in the folded state, and the first area 251 and the second area 252 do not face each other in the unfolded state, in which the hinge assembly 400 includes a hinge bracket 410 including two fixed cams 413*a* and 413*b* and two first rail structures 411*a* and 411*b* that defines two hinge axes Ha and Hb and two hinge structures 420*a* and 420*b* rotatably connected to the two first rail structures 411*a* and 411*b*, respectively, in which each of the two hinge structures 420*a* and 420*b* includes a first hinge member 421 of which one side is connected to the first housing 311 or the second housing 312, and the other side is rotatably connected about the hinge axis Ha or Hb along the first rail structure 411*a* or 411*b*, a second hinge member 422 connected to the first hinge member 421 to integrally rotate with the first hinge member 421 about the hinge axis Ha or Hb and including a rotating cam 4223 interoperating with the fixed cam 413*a* or 413*b* on one side, and an elastic member 424 providing an elastic force to the second hinge member 422 in a direction in which the rotating cam 4223 presses the fixed cam 413*a* or 413*b*, in which the second hinge member 422 is pivotable with respect to the first hinge member 421 about a pivot axis Pa or Pb perpendicular to the hinge axis Ha or Hb.

In an embodiment, each of the two hinge structures 420*a* and 420*b* may further include a pin member 423 penetrating through the first hinge member 421 and the second hinge member 422 in a state in which the elastic member 424 is inserted.

In an embodiment, a pin through hole 42211 into which the pin member 423 penetrates may be formed in the second hinge member 422, and at least a portion of the pin through hole 42211 may be penetrated at an incline for a pivoting operation of the second hinge member 422.

In an embodiment, the first hinge member 421 may include a first structure 4215 on one side, the second hinge member 422 may include a second structure 4224 at a position corresponding to that of the first structure 4215 to interoperate with the first structure 4215, and the first structure 4215 and the second structure 4224 may interoperate with each other and define the pivot axis Pa or Pb.

In an embodiment, the first structure 4215 may include at least one first recess, including recesses 42151 and at least one first protrusion 42152, and the second structure 4224 may include at least one second recess 42242 engaged with the first protrusion 42152, and the second structure 4224 may include at least one second protrusion, including protrusions 42241 engaged with the first recesses, including recesses 42151.

In an embodiment, the first recesses 42151, the second protrusions 42241, and the second recess 42242 may have an arcuate cross-section to rotate while contacting each other.

In an embodiment, the first recess 42151 and the first protrusion 42152 may alternate with each other, and the second recess 42242 and the second protrusion 42241 may alternate with each other.

In an embodiment, the first hinge member 521 may include a protruding pin 5216 protruding in a direction toward the second hinge member 522, and the second hinge member 522 may include an insertion hole 5225 into which the protruding pin 5216 is inserted.

In an embodiment, the first hinge member 421 may include a first structure 4215 that is flat, the second hinge member 422 may include a second structure 4224 protruding as an arcuate cross-section to rotate with respect to the first structure 4215 while contacting the first structure 4215, and the first structure 4215 and the second structure 4224 may interoperate with each other and define the pivot axis Pa or Pb.

In an embodiment, the first hinge member 621 may include a support structure 6217 supporting the elastic member 624.

In an embodiment, the first hinge member 621 may include a protruding guide 6218 protruding in a direction toward the second hinge member 622, the second hinge member 622 may include a guide hole 6226 into which the protruding guide 6218 is inserted, and the protruding guide 6218 and the guide hole 6226 may have an arc shape about the pivot axis Pa or Pb.

In an embodiment, the fixed cam 413*a* or 413*b* may protrude to include a first inclined surface 4131, a first flat surface 4132, and a second inclined surface 4133, and the rotating cam 4223 may protrude to include a third inclined surface 42231, a second flat surface 42232, and a fourth inclined surface 42233.

In an embodiment, in the unfolded state, the first inclined surface 4131 of the fixed cam 413*a* or 413*b* may contact the third inclined surface 42231 of the rotating cam 4223, the elastic force of the elastic member 424 may form a reaction force in a direction perpendicular to the first inclined surface 4131 and the third inclined surface 42231, and the reaction force may act as torque in a direction of maintaining the two hinge structures 420*a* and 420*b* in the unfolded state.

In an embodiment, in an intermediate state between the unfolded state and the folded state, the first flat surface 4132 of the fixed cam 413*a* or 413*b* may contact the second flat surface 42232 of the rotating cam 4223, the elastic force of the elastic member 424 may form a reaction force in a direction perpendicular to the first flat surface 4132 and the second flat surface 42232, and the reaction force may act as a normal force to a frictional force, which maintains the intermediate state, between the first flat surface 4132 and the second flat surface 42232.

In an embodiment, in the folded state, the second inclined surface 4133 of the fixed cam 413*a* or 413*b* may contact the fourth inclined surface 42233 of the rotating cam 4223, the elastic force of the elastic member 424 may form a reaction force in a direction perpendicular to the second inclined surface 4133 and the fourth inclined surface 42233, and the reaction force may act as torque in a direction of maintaining the two hinge structures 420a and 420b in the folded state.

In an embodiment, a hinge assembly 400 applied to a foldable electronic device 300 including a first housing 311 and a second housing 312 includes a hinge bracket 410 including two fixed cams 413a and 413b and two first rail structures 411a and 411b that defines two hinge axes Ha and Hb and two hinge structures 420a and 420b rotatably connected to the two first rail structures 411a and 411b, respectively, in which each of the two hinge structures 420a and 420b includes a first hinge member 421 of which one side is connected to the first housing 311 or the second housing 312, and the other side is rotatably connected about the hinge axis Ha or Hb along the first rail structure 411a or 411b, a second hinge member 422 connected to the first hinge member 421 to integrally rotate with the first hinge member 421 about the hinge axis Ha or Hb and including a rotating cam 4223 interoperating with the fixed cam 413a or 413b on one side, and an elastic member 424 providing an elastic force to the second hinge member 422 in a direction in which the rotating cam 4223 presses the fixed cam 413a or 413b, in which the second hinge member 422 is pivotable with respect to the first hinge member 421 about a pivot axis Pa or Pb perpendicular to the hinge axis Ha or Hb.

In an embodiment, each of the two hinge structures 420a and 420b may further include a pin member 423 penetrating through the first hinge member 421 and the second hinge member 422 in a state in which the elastic member 424 is inserted, a pin through hole 42211 into which the pin member 423 penetrates may be formed in the second hinge member 422, and at least a portion of the pin through hole 42211 may be penetrated at an incline for a pivot operation of the second hinge member 422.

In an embodiment, the first hinge member 421 may include a first structure 4215 formed at one side, the second hinge member 422 may include a second structure 4224 formed at a position corresponding to that of the first structure 4215 such that the second hinge member 422 may interoperate with the first structure 4215, the first structure 4215 may include at least one first recess, including recesses 42151, and at least one first protrusion 42152, the second structure 4224 may include at least one second recess 42242 engaged with the at least one first protrusion 42152 and at least one second protrusion, including protrusions 42241, engaged with the first recesses 42151, the first recesses 42151 and the second protrusions 42241 and the second recess 42242 and the first protrusion 42152 may have an arcuate cross-section to interoperate with each other and define the pivot axis Pa or Pb.

In an embodiment, the first recesses 42151 and the first protrusion 42152 may alternate with each other, and the second recess 42242 and the second protrusions 42241 may alternate with each other.

According to an embodiment, an electronic device 300 includes a display 250 including a first area 251, a second area 252, and a folding area 253 between the first area 251 and the second area 252, a first housing 311 configured to support the first area 251, a second housing 312 configured to support the second area 252, and a hinge assembly 400 configured to connect the first housing 311 to the second housing 312 and operate between a folded state and an unfolded state, in which the first area 251 and the second area 252 face each other in the folded state, and the first area 251 and the second area 252 do not face each other in the unfolded state, in which the hinge assembly 400 includes a hinge bracket 410 including two fixed cams 413a and 413b and two first rail structures 411a and 411b that defines two hinge axes Ha and Hb and two hinge structures 420a and 420b rotatably connected to the two first rail structures 411a and 411b, respectively, in which each of the two hinge structures 420a and 420b includes a first hinge member 421 of which one side is connected to the first housing 311 or the second housing 312, and the other side is rotatably connected about the hinge axis Ha or Hb along the first rail structure 411a or 411b, a second hinge member 422 connected to the first hinge member 421 to integrally rotate with the first hinge member 421 about the hinge axis Ha or Hb and including a rotating cam 4223 interoperating with the fixed cam 413a or 413b on one side, an elastic member 424 providing an elastic force to the second hinge member 422 in a direction in which the rotating cam 4223 presses the fixed cam 413a or 413b, and a pin member 423 penetrating through the first hinge member 421 and the second hinge member 422 in a state in which the elastic member 424 is inserted, in which the second hinge member 422 is pivotable with respect to the first hinge member 421 about a pivot axis Pa or Pb perpendicular to the hinge axis Ha or Hb, the first hinge member 421 includes a first structure 4215 on one side, the second hinge member 422 includes a second structure 4224 at a position corresponding to that of the first structure 4215 to interoperate with the first structure 4215, the first structure 4215 includes at least one first recess, including recesses 42151, and at least one first protrusion 42152, the second structure 4224 includes at least one second recess 42242 engaged with the first protrusion 42152 and at least one second protrusion, including protrusions 42241 engaged with the first recesses 42151, and the first recesses 42151 and the second protrusions 42241 and the second recess 42242 and the first recesses 42151 have an arcuate cross-section to interoperate with each other and define the pivot axis Pa or Pb.

According to an embodiment, a hinge assembly may generate sufficient force while the thickness of the hinge assembly may be decreased, and the thickness of an electronic device may also be decreased.

According to an embodiment, the quality of a folding or unfolding operation of the hinge assembly and the electronic device may be improved.

According to an embodiment, the number of components of the hinge assembly and the electronic device may decrease, and the weight, thickness, and/or costs of the hinge assembly and the electronic device may also decrease.

The embodiments of the disclosure disclosed in the specification and the drawings provide merely specific examples to easily describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

The invention claimed is:
1. An electronic device comprising:
a display comprising a first area, a second area, and a folding area that is between the first area and the second area;
a first housing supporting the first area;
a second housing supporting the second area; and
a hinge assembly foldably connecting the first housing and the second housing to be foldable with respect to each other between a folded state in which the first area and the second area face each other, and unfolded state in which the first area and the second area do not face each other, wherein the hinge assembly comprises:
  a hinge bracket comprising two fixed cams and two first rail structures, the hinge bracket defining two hinge axes; and
  two hinge structures each rotatably connected to a respective one of the two first rail structures,
wherein each of the two hinge structures comprises:
  a first hinge member comprising a first side connected to the first housing or the second housing, and a second side rotatably connected to the respective one of the two first rail structures and configured to rotate about a respective hinge axis of the two hinge axes;
  a second hinge member connected to the first hinge member and configured to integrally rotate with the first hinge member about the respective hinge axis, the second hinge member comprising a rotating cam configured to interoperate with a respective fixed cam of the two fixed cams; and
  an elastic member configured to provide an elastic force to the second hinge member in a direction in which the rotating cam presses the respective fixed cam of the two fixed cams, and
wherein the second hinge member is configured to pivot with respect to the first hinge member about a pivot axis that is perpendicular to the hinge axis.

2. The electronic device of claim 1, wherein each of the two hinge structures further comprises:
  a pin member penetrating the first hinge member and the second hinge member and inserted in the elastic member.

3. The electronic device of claim 2, wherein the second hinge member comprises a pin through hole which is penetrated by the pin member, and
  wherein the pin member penetrates at least a portion of the pin through hole at an incline for a pivoting operation of the second hinge member.

4. The electronic device of claim 1, wherein the first hinge member comprises a first structure on a first side thereof,
  wherein the second hinge member comprises a second structure at a position corresponding to a position of the first structure, and
  wherein the first structure and the second structure are configured to interoperate with each other and define the pivot axis.

5. The electronic device of claim 4, wherein the first structure comprises at least one first recess and at least one first protrusion, and
  wherein the second structure comprises at least one second recess engaged with the at least one first protrusion and at least one second protrusion engaged with the at least one first recess.

6. The electronic device of claim 5, wherein the at least one first recess, the at least one second protrusion, and the at least one second recess have an arcuate cross-section and are configured to rotate while contacting each other.

7. The electronic device of claim 5, wherein the at least one first recess and the at least one first protrusion alternate with each other, and
  wherein the at least one second recess and the at least one second protrusion alternate with each other.

8. The electronic device of claim 1, wherein the first hinge member comprises a protruding pin protruding in a direction toward the second hinge member, and wherein the second hinge member comprises an insertion hole into which the protruding pin is inserted.

9. The electronic device of claim 8, wherein the first hinge member comprises a first structure that is planar,
  wherein the second hinge member comprises a second structure protruding as an arcuate cross-section and configured to rotate with respect to the first structure while contacting the first structure, and
  wherein the first structure and the second structure interoperate with each other and define the pivot axis.

10. The electronic device of claim 1, wherein the first hinge member comprises a support structure supporting the elastic member.

11. The electronic device of claim 10, wherein the first hinge member comprises a protruding guide protruding in a direction toward the second hinge member,
  wherein the second hinge member comprises a guide hole into which the protruding guide is inserted, and
  wherein the protruding guide and the guide hole have an arc shape.

12. The electronic device of claim 1, wherein, in each of the two hinge structures:
  the respective fixed cam of the two fixed cams comprises a first inclined surface, a first flat surface, and a second inclined surface, and
  the rotating cam comprises a third inclined surface, a second flat surface, and a fourth inclined surface.

13. The electronic device of claim 12, wherein, in the unfolded state:
  the first inclined surface of the fixed cam contacts the third inclined surface of the rotating cam, and
  the elastic member is configured to generate a reaction force in a direction perpendicular to the first inclined surface and the third inclined surface to maintain the two hinge structures in the unfolded state.

14. The electronic device of claim 12, wherein, in an intermediate state between the unfolded state and the folded state:
  the first flat surface of the fixed cam contacts the second flat surface of the rotating cam, and
  the elastic member is configured to generate a reaction force in a direction perpendicular to the first flat surface and the second flat surface to maintain the two hinge structures in the intermediate state.

15. The electronic device of claim 12, wherein, in the folded state:
  the second inclined surface of the fixed cam contacts the fourth inclined surface of the rotating cam, and
  the elastic member is configured to generate a reaction force in a direction perpendicular to the second inclined surface and the fourth inclined surface, to maintain the two hinge structures in the folded state.

16. A hinge assembly of a foldable electronic device comprising a first housing and a second housing, the hinge assembly comprising:
  a hinge bracket comprising two fixed cams and two first rail structures, the hinge bracket defining two hinge axes; and
  two hinge structures each rotatably connected to a respective one of the two first rail structures,
  wherein each of the two hinge structures comprises:
  a first hinge member comprising a first side connected to the first housing or the second housing, and a second side rotatably connected to the respective one of the two first rail structures and configured to rotate about a respective hinge axis of the two hinge axes;

a second hinge member connected to the first hinge member and configured to integrally rotate with the first hinge member about the respective hinge axis, the second hinge member comprising a rotating cam configured to interoperate with a respective fixed cam of the two fixed cams; and an elastic member configured to provide an elastic force to the second hinge member in a direction in which the rotating cam presses the respective fixed cam of the two fixed cams, and wherein the second hinge member is configured to pivot with respect to the first hinge member about a pivot axis that is perpendicular to the hinge axis.

17. The hinge assembly of claim 16, wherein each of the two hinge structures further comprises:

a pin member penetrating the first hinge member and the second hinge member in a state in which the elastic member is inserted into the pin member, wherein the second hinge member comprises a pin through hole into which is penetrated by the pin member, and wherein the pin member penetrates at least a portion of the pin through hole at an incline for a pivoting operation of the second hinge member.

18. The hinge assembly of claim 16, wherein the first hinge member comprises a first structure on a first side thereof, wherein the second hinge member comprises a second structure at a position corresponding to a position of the first structure to interoperate with the first structure, wherein the first structure comprises at least one first recess and at least one first protrusion, wherein the second structure comprises at least one second recess engaged with the at least one first protrusion and at least one second protrusion engaged with the at least one first recess, and wherein the at least one first recess, the at least one second protrusion, and the at least one second recess have an arcuate cross-section, are configured to interoperate with each other, and define the pivot axis.

19. The hinge assembly of claim 18, wherein the at least one first recess and the at least one first protrusion alternate with each other, and wherein the at least one second recess and the at least one second protrusion alternate with each other.

20. An electronic device comprising:
a display comprising a first area, a second area, and a folding area that is between the first area and the second area;
a first housing supporting the first area;
a second housing supporting the second area; and
a hinge assembly foldably connecting the first housing and the second housing to be foldable with respect to each other between a folded state in which the first area and the second area face each other, and an unfolded state in which the first area and the second area do not face each other,
wherein the hinge assembly comprises:
a hinge bracket comprising two fixed cams and two first rail structures, the hinge bracket defining two hinge axes; and
two hinge structures each rotatably connected to a respective one of the two first rail structures,
wherein each of the two hinge structures comprises:
a first hinge member comprising a first side connected to the first housing or the second housing, and a second side rotatably connected to the respective one of the two first rail structures and configured to rotate about a respective hinge axis of the two hinge axes;
a second hinge member connected to the first hinge member and configured to integrally rotate with the first hinge member about the respective hinge axis, the second hinge member comprising a rotating cam configured to interoperate with a respective fixed cam of the two fixed cams;
an elastic member configured to provide an elastic force to the second hinge member in a direction in which the rotating cam presses the respective fixed cam of the two fixed cams; and
a pin member penetrating the first hinge member and the second hinge member in a state in which the elastic member is inserted into the pin member,
wherein the second hinge member is configured to pivot with respect to the first hinge member about a pivot axis that is perpendicular to the hinge axis,
wherein the first hinge member comprises a first structure on a first side,
wherein the second hinge member comprises a second structure at a position corresponding the first side of the first structure,
wherein the first structure comprises at least one first recess and at least one first protrusion,
wherein the second structure comprises at least one second recess engaged with the at least one first protrusion and at least one second protrusion engaged with the at least one first recess, and
wherein the at least one first recess, the at least one second protrusion, and the at least one second recess, have an arcuate cross-section, are configured to interoperate with each other, and define the pivot axis.

* * * * *